United States Patent [19]

Darland et al.

[11] Patent Number: 5,101,425
[45] Date of Patent: Mar. 31, 1992

[54] OPERATIONS MONITORING SYSTEM

[75] Inventors: Stanley E. Darland, Silver City, N. Mex.; Terry R. Dettmann, Kirkland, Wash.

[73] Assignee: Digital Systems International, Inc., Redmond, Wash.

[21] Appl. No.: 563,752

[22] Filed: Aug. 7, 1990

[51] Int. Cl.$^5$ .................. H04M 3/22; H04M 15/10
[52] U.S. Cl. .................. 379/34; 379/112; 379/136
[58] Field of Search ............. 379/134, 34, 112, 121, 379/122, 136, 139

[56] References Cited

PUBLICATIONS

Versatile Equipment for Centralized Service Observation, J. D. Flamini, Jr., Automatic Electric Technical Journal, Jan. 1971, pp. 190-196.

Primary Examiner—Stafford D. Schreyer
Attorney, Agent, or Firm—Seed and Berry

[57] ABSTRACT

A computer monitoring system which provides for the dynamic display of calling status information on an outbound dialing system. An operator at the workstation points to icons and, using a mouse, clicks on a selected device representing physical terminals or calling equipment to see summary data related to performance and status. Modifications of the procedure occur when a key is held down while pointing at an icon. In this case, the system will transition to a more detailed display screen and show summary charts and graphs of system or operator performance at their current task.

13 Claims, 18 Drawing Sheets

FIG. 12

OPERATIONS MONITORING SYSTEM

TECHNICAL FIELD

This invention relates to an operations monitoring system for dynamically assessing the productivity and effectiveness of operators working at an automated outbound calling task. More particularly, it relates to systems which allow the system supervisor to visually evaluate operator and system performance quickly and in near real time.

BACKGROUND OF THE INVENTION

Computer systems are widely applied to a variety of tasks in today's increasingly computerized business environment. In particular, over the past several years, computerization has found its way into outbound telephone calling operations through the introduction of systems intended to acquire live contacts for telephone operators without requiring them to spend the necessary time to dial telephone calls and listen to non-productive call results such as busy signals, no answers, and answering machines.

A major limitation of computerized telephone equipment has been the inability to display the information for a supervisor so he is able to determine the effectiveness and efficiency of the equipment and the operators on line. Most equipment provides for some visual display of information, usually in tabular form though sometimes in graphical form. Printed results after completion of the calling day are also generally available. But the ability of a non-technical supervisor to assimilate this information and act on it has been limited by display techniques which make it difficult to monitor the information which is of most concern to them while it is actually happening.

The nature of human effectiveness at any task dictates that corrective instructions to human operators engaged n a calling task is best done as close as possible to the time the task is performed. The nature of large system installations dictates that a supervisor be able to review the progress of an operation at the overview level as well as the detail level to provide the sort of corrective action that is needed. It is desirable for a supervisor to be able to identify global problems and then zero in on them in a simple fashion. It should also be possible for the supervisor to modify the parameters of that review as necessary. The present invention fulfills these needs, and further provides other related advantages.

SUMMARY OF THE INVENTION

The present invention resides in a monitoring system for a user to monitor a telephone management system having a call accounting file maintained on a realtime basis with raw accounting data. The monitoring system includes data acquisition means for reading and interpreting the raw calling account data from the call accounting file. The data acquisition means includes means for periodically reading the raw accounting data from the call accounting file to have near real time call accounting data for processing. The data acquisition means also includes means for converting the raw call accounting data read from the call accounting file to statistics about call operation of the telephone management system which are meaningful to the user.

The monitoring system of the present invention includes display management means for querying the data acquisition means as needed to respond to user requests for selected call accounting data containing near, realtime call accounting data. The monitoring system also has means operable by the user for selectively requesting the display management means to present selected call accounting data which contains near realtime call accounting data.

Also included are means for transferring user requests for selected call accounting data from the display management means to the data acquisition means, and for transferring the selected call accounting data from the data acquisition means to the display management means. The monitoring system has means for presenting to the user the selected call accounting data provided by the data acquisition means to the display management means.

The means for presenting the selected call accounting data includes a visual display device, and the display management means formats the selected call accounting data for graphical presentation on the visual display device. The display management means selects from a plurality of graphical displays for the selected call accounting data, with the particular graphical display being selected by the display management means based upon the particular call accounting data selected by the user.

The means operable by the user allows the user to alternately select call accounting data on a single telephone operator using the telephone management system and call accounting data on all telephone operators using the telephone management system for a selected job being run on the telephone management system. The means operable by the user also allows the user to select call accounting data on a selected job being run on the telephone management system from a plurality of jobs being simultaneously run on the telephone management system.

The means operable by the user further includes means to alter the formats used by the display management means for the selected call accounting data. As such, the user can tailor the formatting of the selected call accounting data presented on the visual display device to suit the user's management needs. The means operable by the user includes means to alter the graphical displays used for the selected call accounting data on the visual display device.

In a preferred embodiment of the invention, upon initial startup of the monitoring system, the data acquisition means automatically reads the raw accounting data available from the call accounting file to establish initial call accounting data for processing prior to receiving a query for selected call accounting data from the display management means. The data acquisition means periodically reads the raw call accounting data from the call accounting file without interfering with the operation of the telephone management system. As such, a user of the telephone management system will be unaware that the monitoring system is in operation.

The present invention satisfies the need for real time information on telephone calling systems use to supervisors beyond simply providing information in simple tabular form. The present invention uses current thinking on interface technology to creating a series of displays which can be controlled by the supervisor using the invention to show the information he most needs in easily assimilated form. The supervisor may select which display is most useful and configure the operating parameters of the display in a simple and direct fashion.

The invention integrates information about a telephone calling system's operations into an icon driven, graphical display system which is directly responsive to real time requests for information about calling system progress.

Other features and advantages of the invention will become apparent from the following detailed description, taken in conjunction with the accompanying drawings.

BRIEF DESCRIPTION OF THE DRAWINGS

FIG. 12 is a configuration display used by the invention.

DETAILED DESCRIPTION OF THE INVENTION

Figure 1:
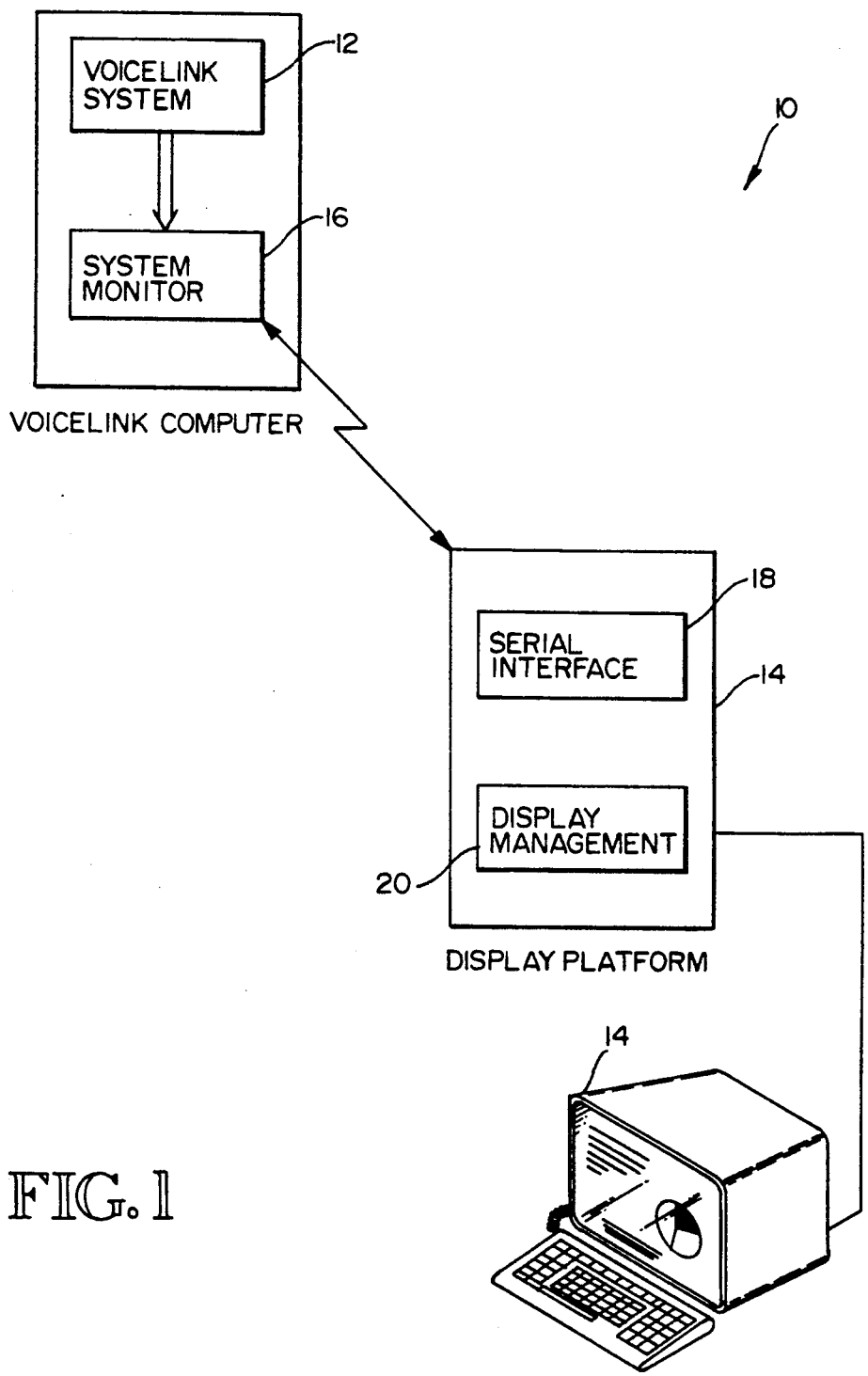
FIG. 1 is a block diagram of the system components of the present, invention shown for use with a Voicelink inbound/outbound call management system.

As shown in the drawings for purposes of illustration, the present invention is embodied in an operations monitoring system, indicated generally by reference numeral 10. FIG. 1 shows a block diagram of the major components of the monitoring system 10 connected to a Voicelink system 12. The Voicelink system 12 is an inbound/outbound call management system sold by Digital Systems International of Redmond, Wash. The Voicelink system interfaces to host computer systems, builds calling programs, and manages them for outbound calls and integrates inbound calling operations within the same environment. It can manage multiple jobs simultaneously and provide real time response to telephone operators and their supervisors.

The Voicelink system provides monitoring of system operation through a Job Monitor system internal to the Voicelink system. This program provides supervisors with information regarding system performance on the least common denominator ASCII TTY terminal which is standard on the Voicelink system. The monitoring system 10 of the present invention taps into the information generated by the Voicelink system to provide an alternate, more human oriented monitoring interface which takes advantage of the benefits of direct graphical displays and advances in small computer power.

In the illustrated preferred embodiment of the invention, the monitoring system 10 is resident in part on a Macintosh computer manufactured by Apple Computer, Inc., and in part on the computer of the Voicelink system 12. The Macintosh computer comprises a display platform 14 of the monitoring system 10 and contains the software programs that control the video monitor configuration and displays of the monitoring system. The computer of the Voicelink system 12 contains an interface program that comprises a system monitor 16 of the monitoring system 10 and supplies information on jobs currently running on the Voicelink system, as well as information on the operators logged onto the telephone dialing system. The monitoring system 10 includes monitoring software which monitors the operation of the Voicelink system 12 and display software which presents an operator-oriented view of the Voicelink system operation.

The system monitor 16 reads information from the Voicelink system 12 event tables and maintains an internal status of the current state of the Voicelink system. Internal tables record information on the following:

| | |
|---|---|
| JOBNAME | Name of a system job. |
| STATNAME | Name of the statistics data file for the job. |
| LISTNAME | Name of the calling list file for an outbound calling job. |
| JOBNUM | Uniquely assigned serial number used by the Voicelink system. |
| JOBACTIVE | Flag indicating job's current state as active or inactive. |
| JOBSTAT | Current job status as CALLING, SUSPENDED, SETUP. |
| STARTDATE | Date the job started. |
| STARTTIME | Time the job started. |
| FIRSTCALL | Time of the first telephone call. |
| UPDTIME | Time of last data update. |
| NCALLS | Number of calls processed by the job. |
| RECALLS | Number of recalls placed because of busy or no answer conditions. |
| OPCALLS | Number of calls which were handled by operators. |
| CALLRESULTS | Vector of all final status codes for calls indicating user specific classification of telephone call results. |
| TIMESTATS | Vector of telephone call timers averaged over all calls. |

Internal State Information

The same information is also kept on an operator-by-operator basis so that a breakdown of operator performance data can be provided as well as job performance data. This activity continues on an interrupt basis constantly while running.

As an asynchronous activity, the system monitor 16 provides a serial interface for the Voicelink system 12 with the outside world. This interface will accept queries from a remote computer system such as the display platform 14 which request information about the state of the Voicelink system itself from the internal tables kept by the system monitor. The commands available at this interface are:

| | |
|---|---|
| UPDATE | Send a data vector. |
| EXIT | Exit the system monitor. |
| CONFIG | Set an internal configuration. |
| WHO | Check for logged in operators. |
| QUERY | Query for status information. |
| STATUS | Status of internal configuration. |
| SNDKEYS | Send keystroke configurations for existing job. |

Commands Available

The system monitor 16 can be accessed by a variety of communication paths from a remote monitoring station where a user operates the display platform 14. This can include a direct serial connection (where a physical wire connects the display platform 14 at the monitoring station and the system monitor 16 at the location of the Voicelink system 12), a dialup connection through the telephone network (where a modem can be used to establish the connection between the system monitor and the display platform), or through a computer network (such as an Ethernet system). Communications through this channel are serial and command oriented The display platform 14 requests specific information it needs by giving a command to the system monitor 16. The system monitor responds with the required information or a message if the information requested is not available. The messaging used is terse to keep communications to a minimum, but it is human readable for easy error checking and debugging.

On the display platform 14, a serial interface 18 provides background communications with the Voicelink system 12. All communications take place in the background, unseen by the user of the Voicelink system. This interface responds to commands from a display management system 20, resident on the display platform computer, which controls all interaction with the user of the monitoring system 10. A Macintosh computer is used in the monitoring system described herein, but this is not essential and other computers may be used.

The display management system 20 creates the visual look of the monitoring system 10 as a series of six basic displays plus additional windows which come up as needed during the interaction with the Voicelink system 12. It also manages interaction with the user of the monitoring system, accepting input from the keyboard or mouse, and taking appropriate action based on this input. This interface is a "point and shoot" type interface, controlled by a pointing device such as a mouse which allows a user to select his desired target and simply click the mouse button to get current information.

Figure 2:
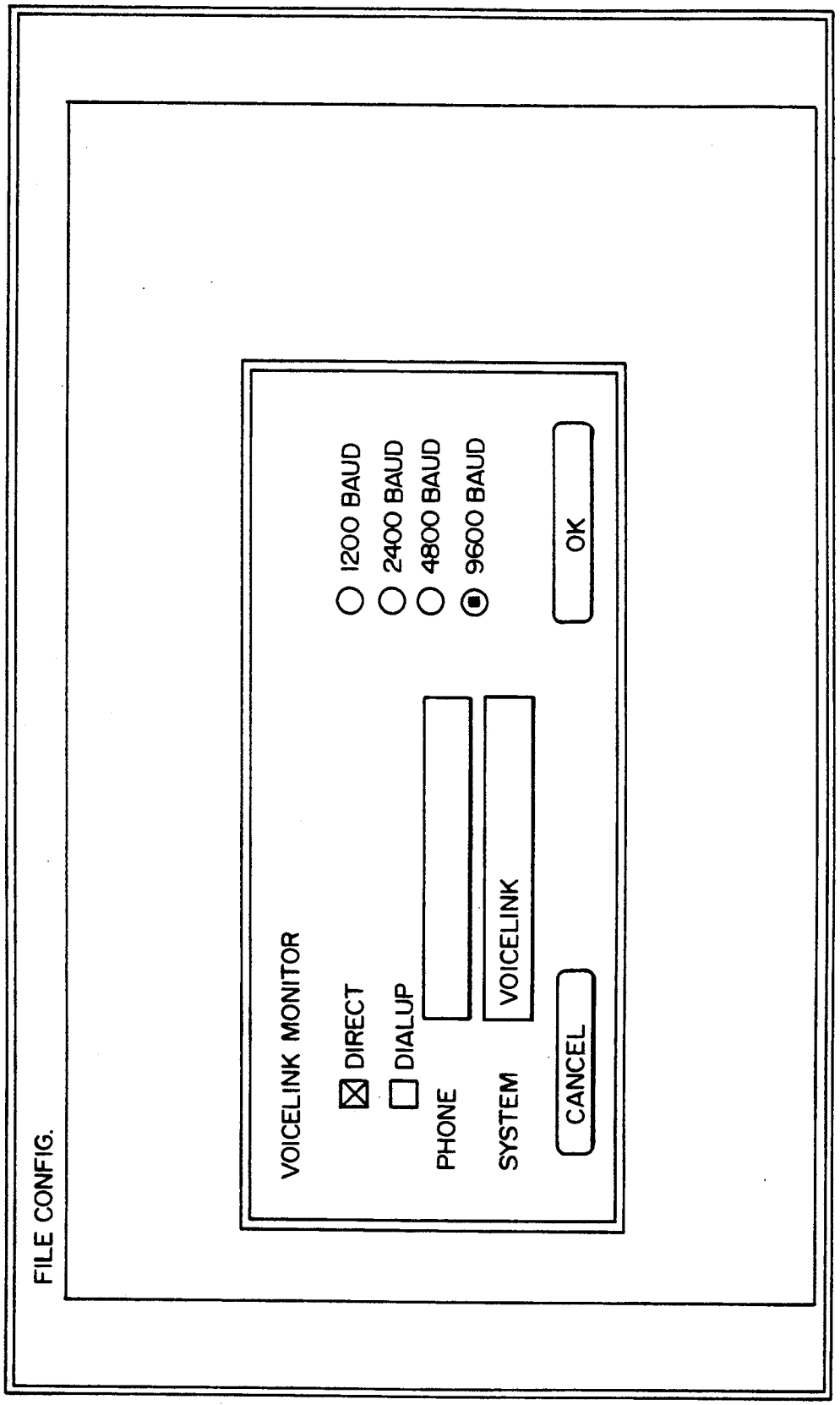
FIG. 2 is a startup display used by the invention.

FIG. 2 shows the initial startup screen display of the monitoring system 10. A window requests system connection information using the serial port of the monitoring system as either a DIRECT connection (used for direct wiring or network connections), or as a DIALUP (used when the Voicelink system to be monitored is remote and the connection is via modem). The user selects the proper communication type which causes the display to automatically select the normal parameters for such a communication (1200 baud connection speed for a modem, 9600 baud for a direct connection). If the user accepts these parameters, he can choose the "OK" option and proceed, otherwise he can point at any alternate parameter to select it (e.g., the 4800 baud modem connection). If the connection is through a modem, the monitoring system will require a telephone number to be input prior to proceeding.

Figure 3:
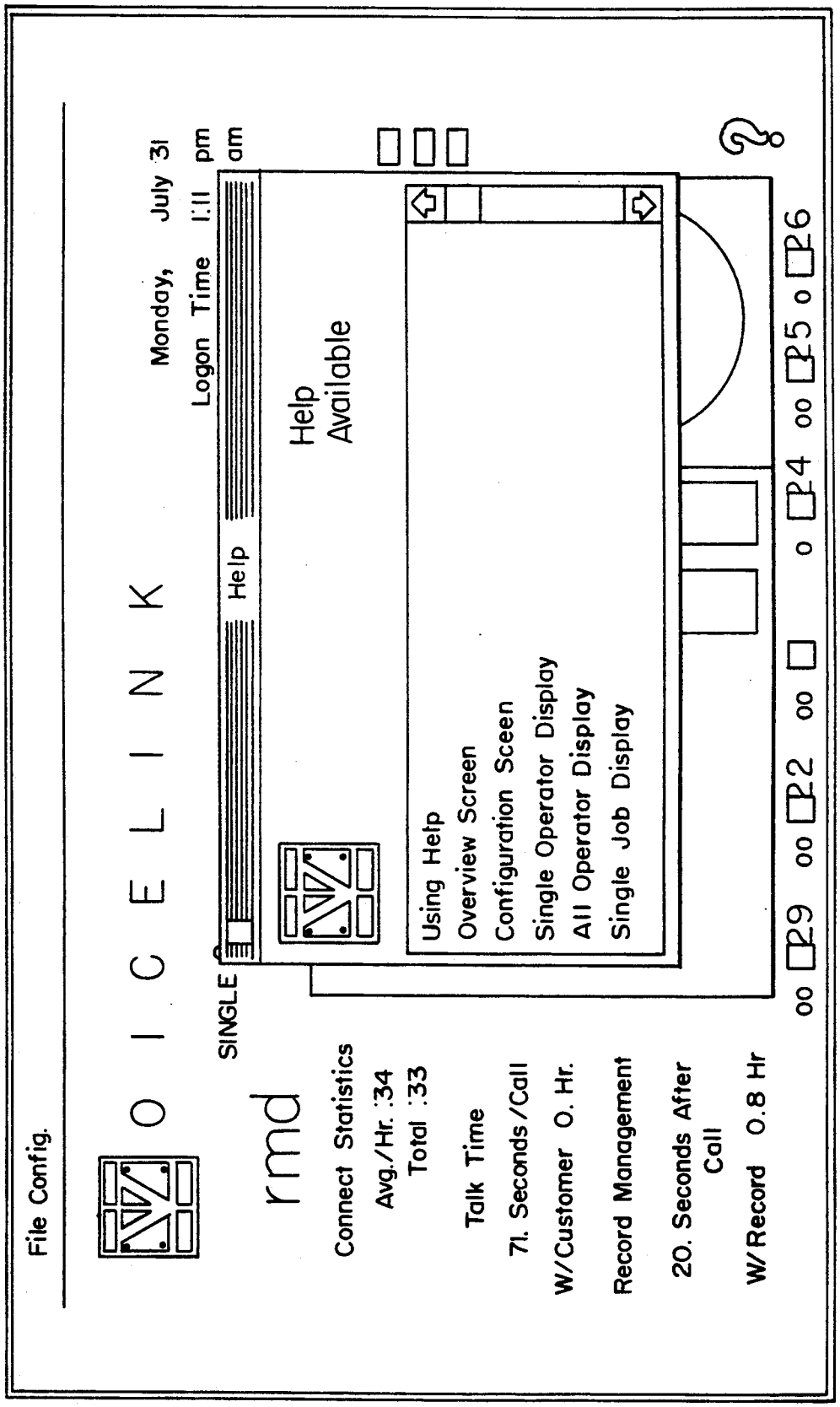
FIG. 3 is a Voicelink login display used by the invention.

Once the configuration method is determined, the display changes to FIG. 3, the Voicelink Login display. This display is used to inform the user of the status of the attempt to connect to the remote Voicelink system, which might take several minutes in the case of a Voicelink system connected by telephone due to network delays and routing. A small visual terminal icon is used to show the status of the connection to the desired Voicelink system.

Figure 4:
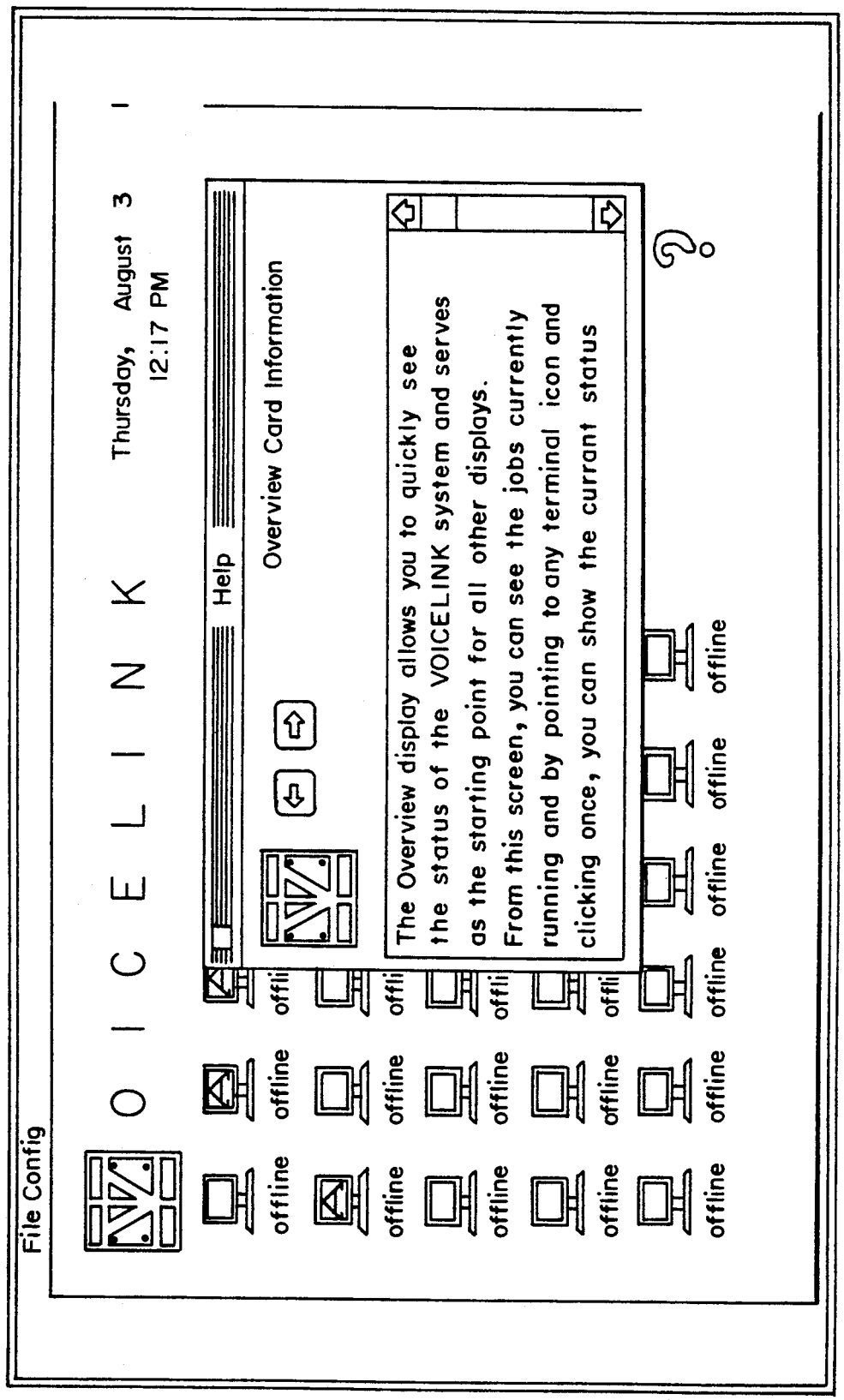
FIG. 4 is an overview display used by the invention.

Once the actual connection is made and the display has established communication with the system monitor 16 on the selected Voicelink system 12, the monitoring system 10 sends any necessary configuration commands for automatic update frequencies and display modes, and then proceeds to the Overview display shown in FIG. 4. The Overview display shows the following elements:

| | |
|---|---|
| TERMINALS: | Terminal icons represent physical terminals connected to the Voicelink system 12. |
| VOICELINK: | A system icon represents the physical Voicelink system itself. |
| QUESTION MARK: | A help system trigger calling for information about this display screen. |
| APPLE MENU: | A support menu giving access to help information, information about the program, and additional background programs not related to the present invention. |
| FILE MENU: | A support menu allowing the user to change Voicelink systems, connect or disconnect from the present system, or quit operation all together. |
| CONFIG MENU: | A support menu allowing the user to change the configuration of the display management system 20. |

As shown in FIG. 4, the terminal display elements are arranged in simple rows as a standard procedure, but may be presented in a floor layout option by editing the display screen without affecting the functionality of the invention itself.

Operations on each of these elements and resulting displays are discussed in more detail below. As will be described, different screens show data gathered by the monitoring system in response to system operations.

Figure 5A:
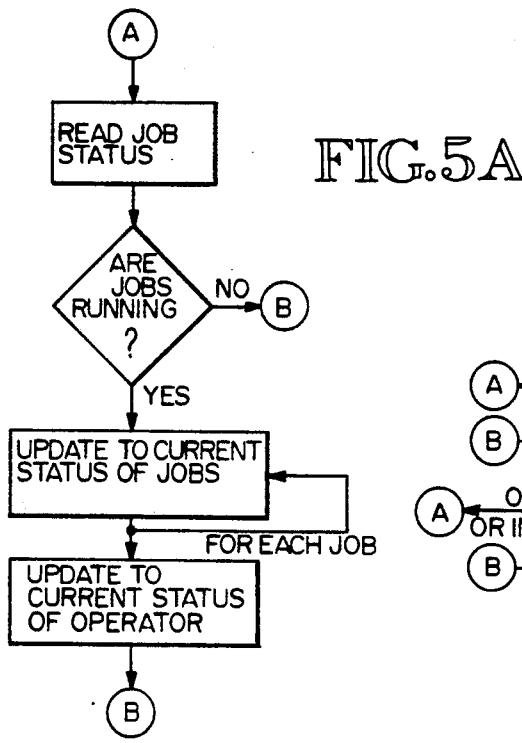
FIG. 5a is a partial flowchart of the data collection module of the invention.
Figure 5B:
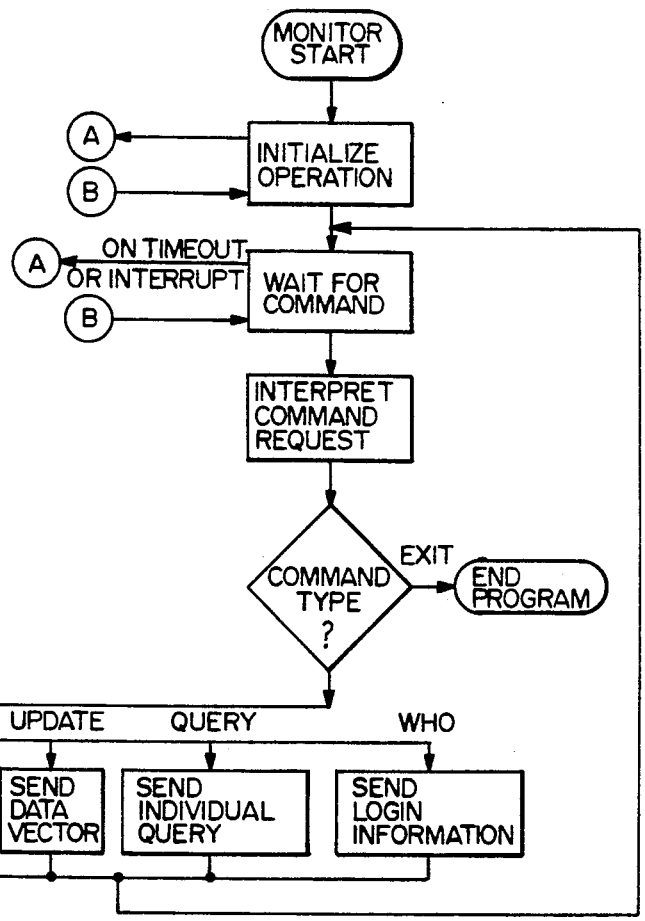
FIG. 5b is a partial flowchart of the data collection module of the invention.

FIGS. 5a and 5b are flow charts showing the basic operation of the system monitor 16. The system monitor starts in response to a command from the monitoring system 10. It is started by the display management system 20 first passing a standard security login procedure to the underlying Voicelink system 12 as would any connection by a live operator. In response to a successful login, the system monitor is started.

On startup, the system monitor 16 initializes its operation by first looking through the Voicelink system 12 and determining the current state of the Voicelink system. It determines the identities and characteristics of all jobs then running and reads their event statistics files to determine the current state of each job and its operators. Once the system monitor has determined the current state of the Voicelink system, it stands ready to answer queries from the display platform 14. The system monitor places itself into a query mode, and waits for questions.

While in the query mode, the system monitor 16 also works on an interrupt basis causing it to go back and update its internal tables of information about the progress of jobs on the Voicelink system. Interrupts may occur at any time or periodically force the system program to update current status information.

Queries received by the system monitor 16 are handled by assembling the requested information from the tables and transmitting the information to the display platform 14 from which the query was received.

Figure 6:
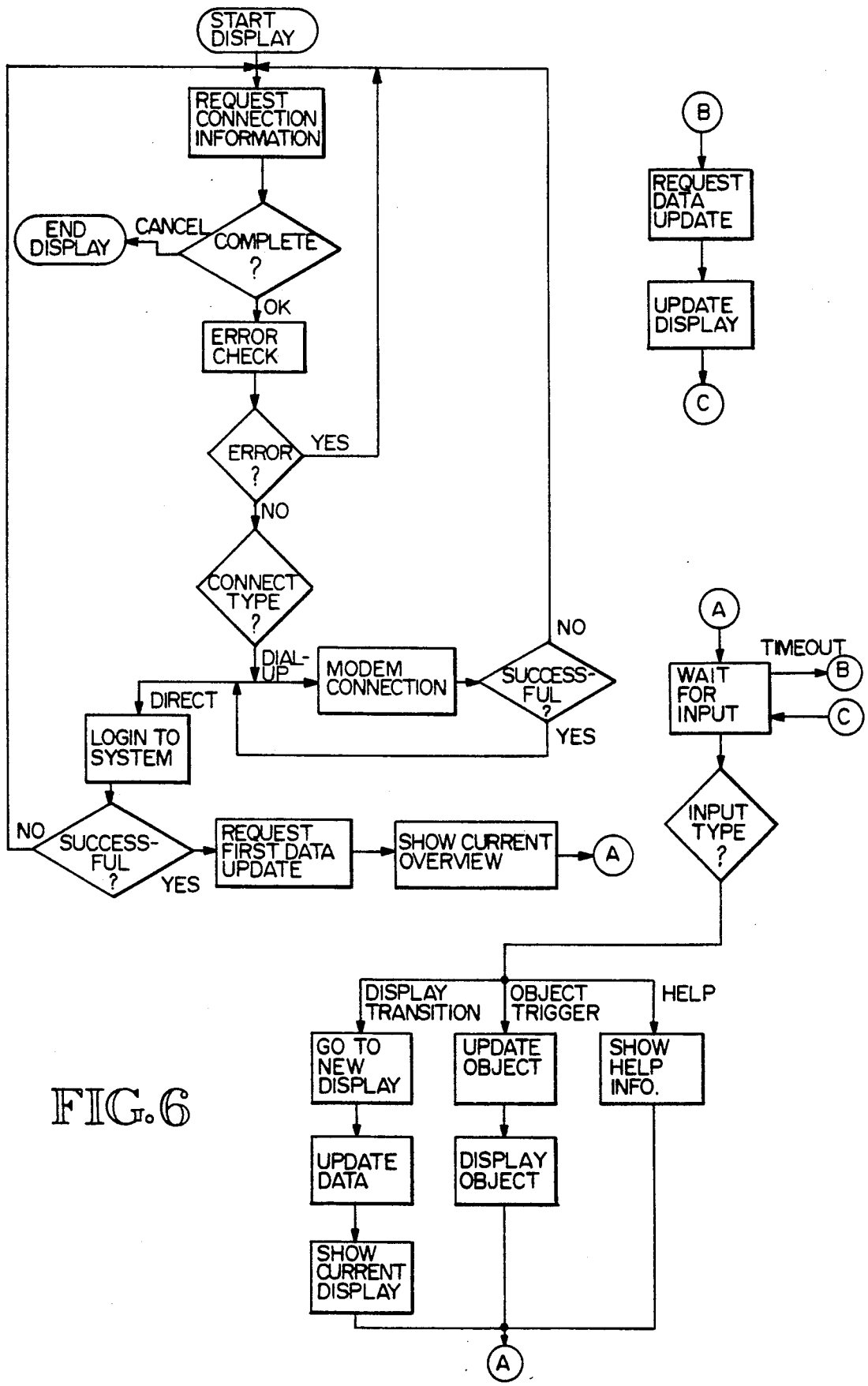
FIG. 6 is a flowchart of the operator module of the invention.

FIG. 6 is a flow chart showing the user side of the monitoring system 10 on the display platform 14. On the user side, the monitoring system will start up and first request connection information. Once connection information is supplied and errors checked, the monitoring system will complete the appropriate connection and then proceed to update its own display information and show an initial Overview display (see FIG. 4). This update only takes into account the presence of operators on the Voicelink system and whether jobs are presently running. From this point, the display system slips into a similar command driven style of interface, waiting for the user to request information. It also has a periodic update interrupt which causes the display platform to request fresh information from the system monitor 16 for the current display.

The user, using the mouse as a pointing device, selects the desired information or branches to another display, and the display platform will request the appropriate information and display it. The description below gives the detailed procedures used for this operation. The procedures are described using a Macintosh computer and the Voicelink system presently sold by Digital Systems. The monitoring system 10 of the present invention is also usable with inbound/outbound call management systems of other manufacturers. It is further noted that while the displays with system performance information are described as appearing on the computer monitor screen, the information could be presented in other manners such as projected on a large screen or provided aurally to the user using a speech synthesis program.

Starting The Monitoring System

The monitoring system 10 can be located directly on the desktop display of the Macintosh computer, placed on the hard disk, or placed in another folder of the user's choosing. This provides a flexible environment with respect to the location of the monitoring system.

The following steps are taken to start up the monitoring system, which is initially installed on the hard disk:
1. The user turns on power to the Macintosh computer. The system powers up to the basic desktop
2. The user accesses the monitoring system. For example, the user finds the monitoring system icon located on the hard disk identified as the Productivity icon on the screen appearing on the computer monitor. He then points to the productivity icon and clicks the mouse button twice. A window showing items on the hard disk will be displayed.
3. The user then points to the monitor icon and he double-clicks the mouse button to start the monitoring system. The monitoring system Startup screen displays on the computer monitor, as shown in FIG. 2.

This screen allows the user to choose between a direct line hookup with his Voicelink system or a dialup to the Voicelink system. It also allows the user to set the appropriate Baud rate for his hookup. The dialup connection is used only when a separate modem is connected to the Voicelink system for use with this system and a modem is connected to the Macintosh computer.

For purposes of illustration, a direct hookup to Voicelink using a 9600 Baud rate is used, as shown in FIG. 2.
4. The user points to the "OK" option and clicks the mouse button twice. The monitoring system initiates a login to the user's Voicelink system, displaying the Voicelink Login screen, as shown in FIG. 3.

If the login fails, the monitoring system tells the user it could not complete the connection and returns him to the Startup screen (FIG. 2). The user can either repeat the startup process or select the "Cancel" option to quit.

When logging in is complete, the monitoring system displays the Overview screen, as shown in FIG. 4.

The Overview screen gives the user an immediate update on operator and job status. When the screen is displayed, the monitoring system immediately updates each calling operator work station on the user's Voicelink system (represented on the screen by a terminal icon). Operators logged onto the Voicelink system are identified by name on their terminal icon. A black terminal icon indicates the terminal is not in use. An "A" in the terminal icon indicates the operator is active on a job. An "I" in the terminal icon indicates an operator is logged on to Voicelink but inactive with respect to all current jobs. After each terminal has been updated, the screen displays the names of current jobs. A globe icon stops rotating when the update process has been completed.

How to Use the Overview Screen

The Overview screen is the hub of the monitoring system. From this display the user can access statistics on single operators or single jobs. He can also change the setup of the computer monitor using the pull-down "Config" menu. He can print statistical displays using the pull-down "File" menu. And, he can exit the monitoring system using the pull-down "File" menu. The following list describes the key tasks the user can perform from the Overview screen:

Update the Overview

Using the mouse, the user points to the Voicelink icon and then clicks the mouse button. The computer monitor updates the display for each terminal and operator as well as jobs currently running.

Display a Quick Operator Summary

Using the mouse, the user points to the operator's terminal icon and then clicks the mouse button once. The computer monitor displays a quick summary of operator statistics. For more detail, see the discussion that follows called Using the Quick Operator Display.

Display Detailed Operator Statistics

The user points to the operator's terminal icon. He holds the Shift key down and clicks the mouse button on the terminal icon. The computer monitor displays a statistics screen on the operator. For more detail, see the discussion that follows called Using the Single Operator Display.

Display All Operator Statistics

The user points to the Voicelink icon. He then holds down the Option key and clicks the mouse button. The user then selects the job he wants from the jobs listed in the window. For more detail, see the discussion that follows called Using the All Operator Display.

Display Single Job Statistics

The user points to the Voicelink icon. He then holds down the Shift key and clicks the mouse button. The user then selects the job he wants from the jobs listed in the window. For more detail, see the section that follows called Using the Single Job Display.

Change the Configuration

The user points to the "Config" menu and holds the mouse button down to display the Configuration menu. For more detail, see the discussion that follows called Setting System Configuration.

Print Displayed Information

The user points to the "File" menu and holds the mouse button down to display the File menu. The user then pulls the mouse button down to "Print" and releases it to print a copy of the screen. For more detail, see the discussion that follows called Printing Screen Displays.

Exit the Monitor

The user points to the "File" menu and holds the mouse button down to display the File menu. The user then pulls the mouse button down to "Quit" and releases it. The computer monitor returns the user to the Startup screen (FIG. 2). The user can then select the "Cancel" option to exit the monitoring system. It is noted that both the "File" and "Config" menus are accessible on other monitor display screens.

Getting Help

Online help is available throughout the monitoring system. Help information comes to the user in three different ways:
 Help on the current display
 Context-sensitive help on monitor functions
 Help directory listing help screens by subject

Help on the Current Display

Figure 7:
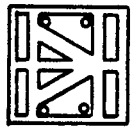
FIG. 7 is a help window display used by the invention.

The user points to the "?" option in the lower right part of any screen (for example, see FIG. 4) and clicks the mouse button. The computer monitor displays a Help Window like the one shown in FIG. 7.

The user can use his mouse button on the right side bar of the window to scroll up and down the help information. To close the help window, the user points to the open square in the top left corner of the window and clicks the mouse button.

Context Sensitive Help

The user points to any icon or functional area on the screen. He then holds down the Apple key of the computer and clicks the mouse button. The computer monitor displays a help screen with specific information on the screen function he has selected. When no help information exists for the item or area pointed to, the monitoring system displays the Help Directory listing, with the subjects covered by online help screens.

Help Directory

Figure 8:
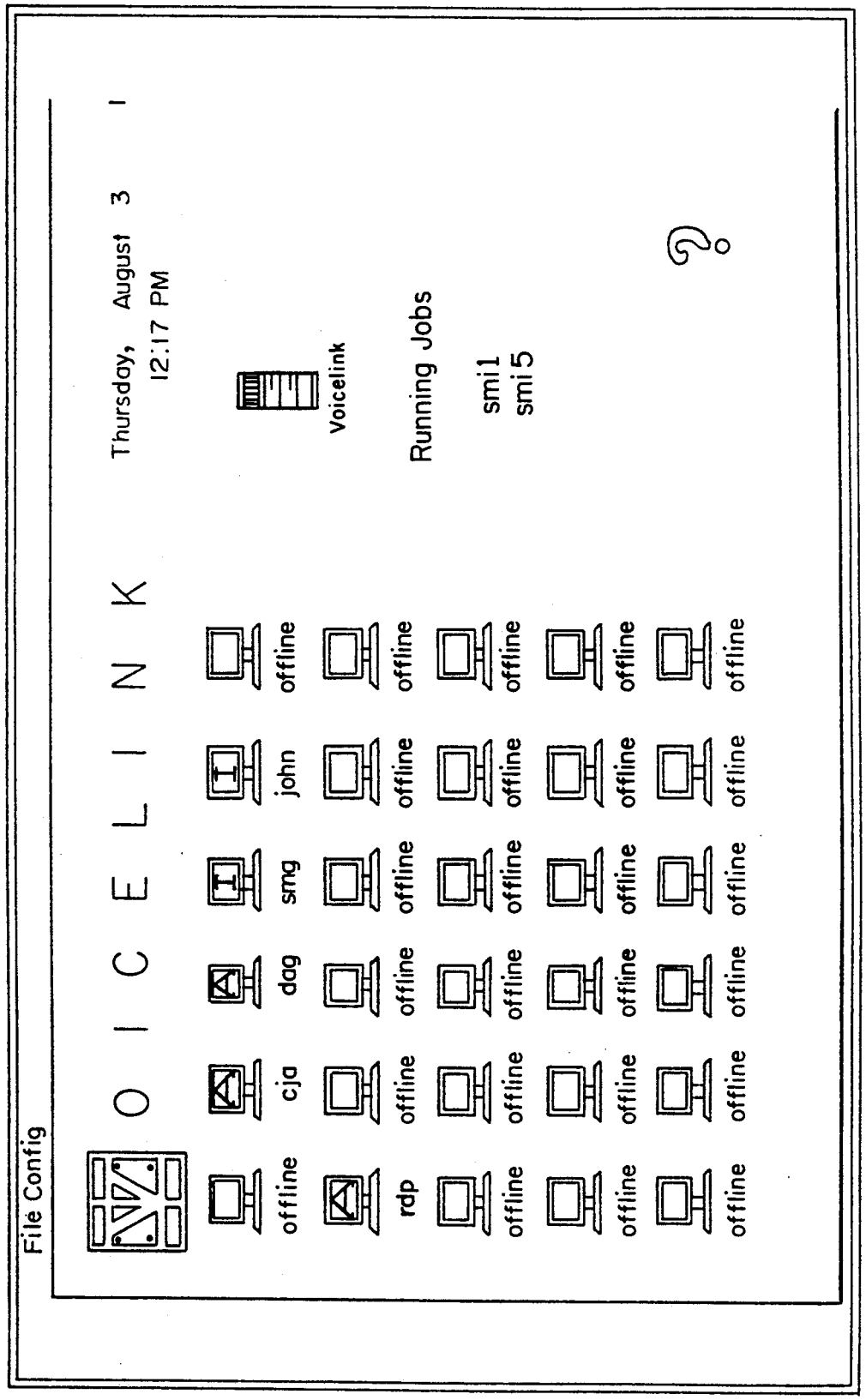
FIG. 8 is a help directory display used by the invention.

The user uses the mouse to point to any open space. He then holds down the Apple key of the computer and clicks the mouse button. The computer monitor displays the Help Directory, as shown in FIG. 8.

The user then uses the mouse to scroll through the directory and select the help subject desired. He then clicks the mouse button on the desired subject to display help information. A click on the box in the top left corner of the window returns the user to the monitor display screen.

Using the Quick Operator Display

Using the Quick Operator display will provide the user with a rundown of the basic operator statistics available from the Voicelink system. It allows him to view in an abbreviated form statistics on operator time spent on their present job. More detailed information is available by using the Single Operator Display discussed hereinafter.

The terminal icons identify the operators logged onto the Voicelink system and who have joined jobs. The operator's name is displayed below the icon.

To access the Quick Operator display, the user points to the icon and clicks once. A small window opens and displays information, such as shown below:

| | |
|---|---|
| Operator: | MKD |
| Terminal: | /dev/tty6 |
| Logon Time: | 10:31:04 |
| Job: | SMI6 |
| Last Update: | 15.52.59 |
| # of Connects: | 391 |
| # of Teleplus: | 61 |

The following list describes the information supplied on the Quick Operator display:

| Field | Description |
|---|---|
| Operator: | Displays operator name or system ID (e.g., operator initials). |
| Terminal: | Identifies the physical terminal location. |
| Logon Time: | Shows time, based on a 24-hour clock, that the operator logged onto the Voicelink system. |
| Job: | Displays the name of the job the operator is currently working. |
| Last Update: | Indicates the time, based on a 24-hour clock, when the screen was last updated. |
| # of Connects: | Shows the number of total connects made by the operator since logging onto the Voicelink system. |
| # of Teleplus: | Shows the number of connects made for the release code specified in the monitoring system configuration. The monitoring system highlights one release code, selected by the user, and displays results on that code for all operators. More information is provided in the discussion on Setting System Configuration. |

To display the full Overview screen again, the user clicks the mouse button once and the window disappears.

Using the Single Operator Display

The Single Operator display provides the user with a complete view of an operator's statistics in a simplified form. Two charts are used to help evaluate the operator's performance in realtime during a job. This information must be understood to be realtime information only. It will appear only while the job is running and will be discarded when the job is complete.

The following procedure is used to access the Single Operator display:

1. The user points to the terminal icon for the operator he wishes to display.
2. The user holds the SHIFT key of the If computer and clicks the mouse button on the terminal icon. this is done for a terminal which is shown as OFFLINE or for an operator who is not presently signed on to a job, the following message is provided:

"Operator is not logged onto a job."

Figure 9:
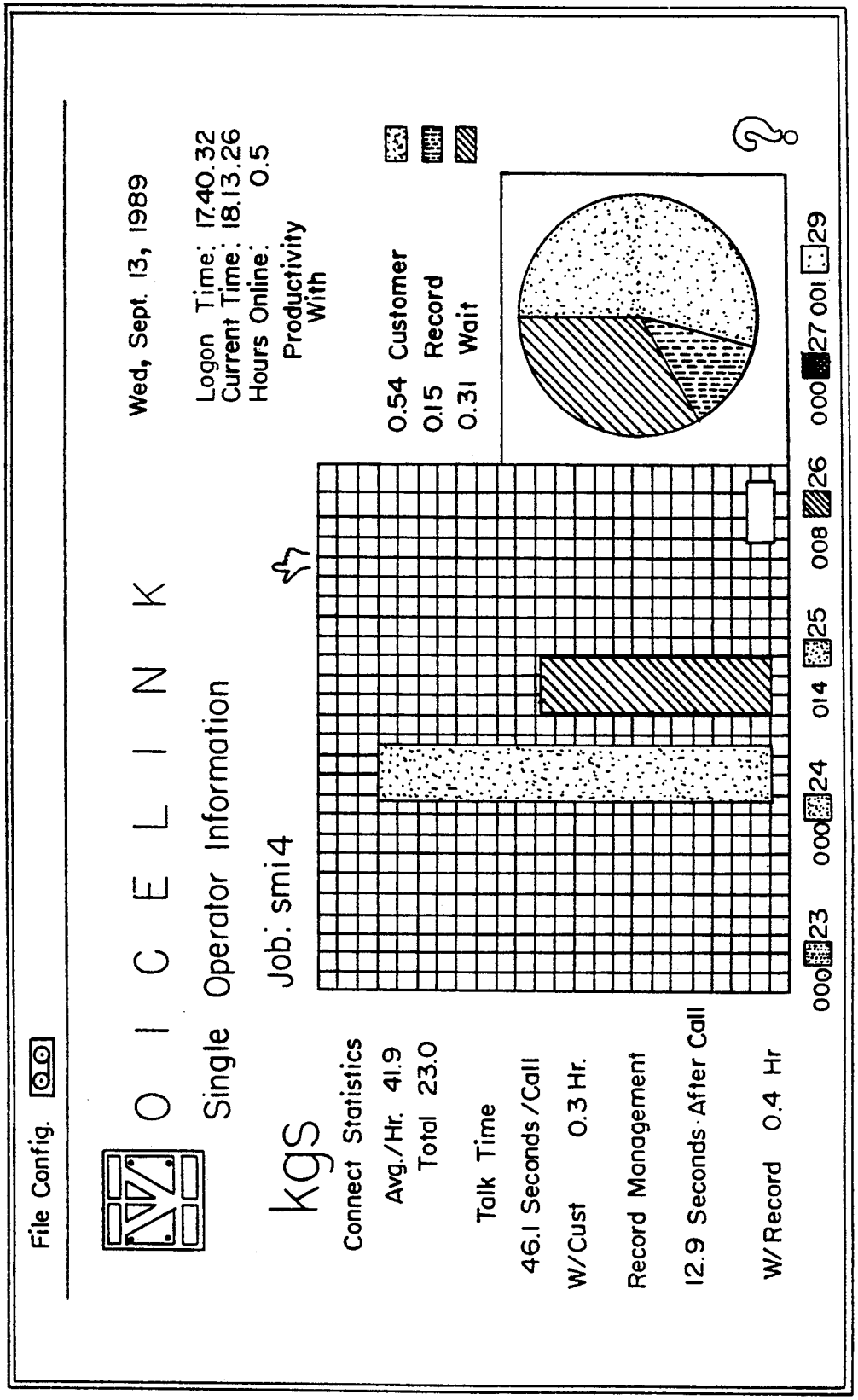
FIG. 9 is a single operator display used by the invention.

The monitoring system displays the Single Operator display screen, as shown in FIG. 9. When the display appears, the various data fields begin to display information about the operator extracted from the Voicelink system. Next, the operator's bar chart fills in to show the operator's calling results across six selected release codes. Finally, the operator's productivity chart updates to show the use of the operator's time on the system.

It is noted that the Overview screen can show an operator active (indicated by the letter "A" in the terminal icon) on a job who has quit that job since the last update. When this happens, the computer monitor provides the message:

"No Data Available"

The user can click the mouse button on the "OK" option to return to the Overview display and select another operator.

Each display of the Single Operator Display which the user views identifies the operator selected by name or system ID. Blocks of different types of statistical information appear on the display, such as shown in FIG. 9.

The Release Code Bar Chart in the center of the screen of FIG. 9 shows the number of times the operator has released records using the selected code. Each code is documented beneath the chart in three ways:

A three-digit number shows the number of times the release code has been used.
A pattern block identifies the specific bar used to represent the code on the chart.
A two-digit number shows the actual release code number.

The chart is automatically scaled to fit the window.

The user can control the release codes displayed through the "Tables" option on the "Config" menu. The user can change the release codes as needed to meet his ongoing requirements for monitoring operator performance on a given job.

The user can see the definition for each release code by pointing to the code number at the bottom of the screen and clicking the mouse button. A small explanation box pops up containing a short explanation for the release code.

The operator's productivity chart in FIG. 9 shows the time spent by the operator in three activities:

Online with a customer (With Customer)
Updating the data record (Record Time)
Waiting for calls (Wait)

These three activities taken together comprise 100% of the operator's time on any given job. The pie chart shows the distribution of these times and so gives a measure of the operator's performance on the Voicelink system.

Evaluating these times to achieve best operator performance depends heavily on the installation and the job in progress. Large amounts of operator waiting time can indicate tuning problems in running the Voicelink system. It may mean that the system has too many operators online or that the job is not using a high enough IDA value (an intelligent dialing algorithm used by the Voicelink system to determine the strategy by which outbound calls are arranged), and thus is not being very aggressive in pursuing the calling mission.

The left side of the Single Operator Display of FIG. 9 provides the user with the following statistics:

| Field | Description |
| --- | --- |
| Connect Statistics | |
| Avg/Hr: | Average connects per hour on the current job. |
| Total: | Total connects the operator has made on the current job. |
| Talk Time | |
| Seconds/Call: | Average talk time per call expressed in seconds. |
| W/Customer: | Total time with all customers expressed in hours. |
| Record Management | |
| Seconds After Call: | Average time on record after call expressed in seconds. |
| W/Record: | Total time with all records expressed in hours. |

The right side of the Single Operator Display of FIG. 9 provides the user with the following information:

| Field | Description |
| --- | --- |
| Date: | The current date. |
| Login Time: | The time the operator joined the job shown on a 24-hour clock. |
| Current Time: | The current system time. |
| Hours Online: | The number of hours on the job. |

After the screen has generated its statistics, it remains static to allow the user whatever time he needs to evaluate the information on the screen and, if a printer is attached, to print it.

Updates occur to the screen only on command. The user must point to the bar chart in the center of the screen and click the mouse button. The display updates all information again as it did when it first displayed on the computer monitor To leave the display and return to the Overview screen, the user points to the Voicelink "V" symbol in the upper left corner and clicks the mouse button.

Using the All Operator Display

The All Operator display provides a complete view of one job's statistics in a simplified form. This information must be understood to be realtime information only. It appears only while the job is running and will be discarded when the job is complete.

Figure 10:
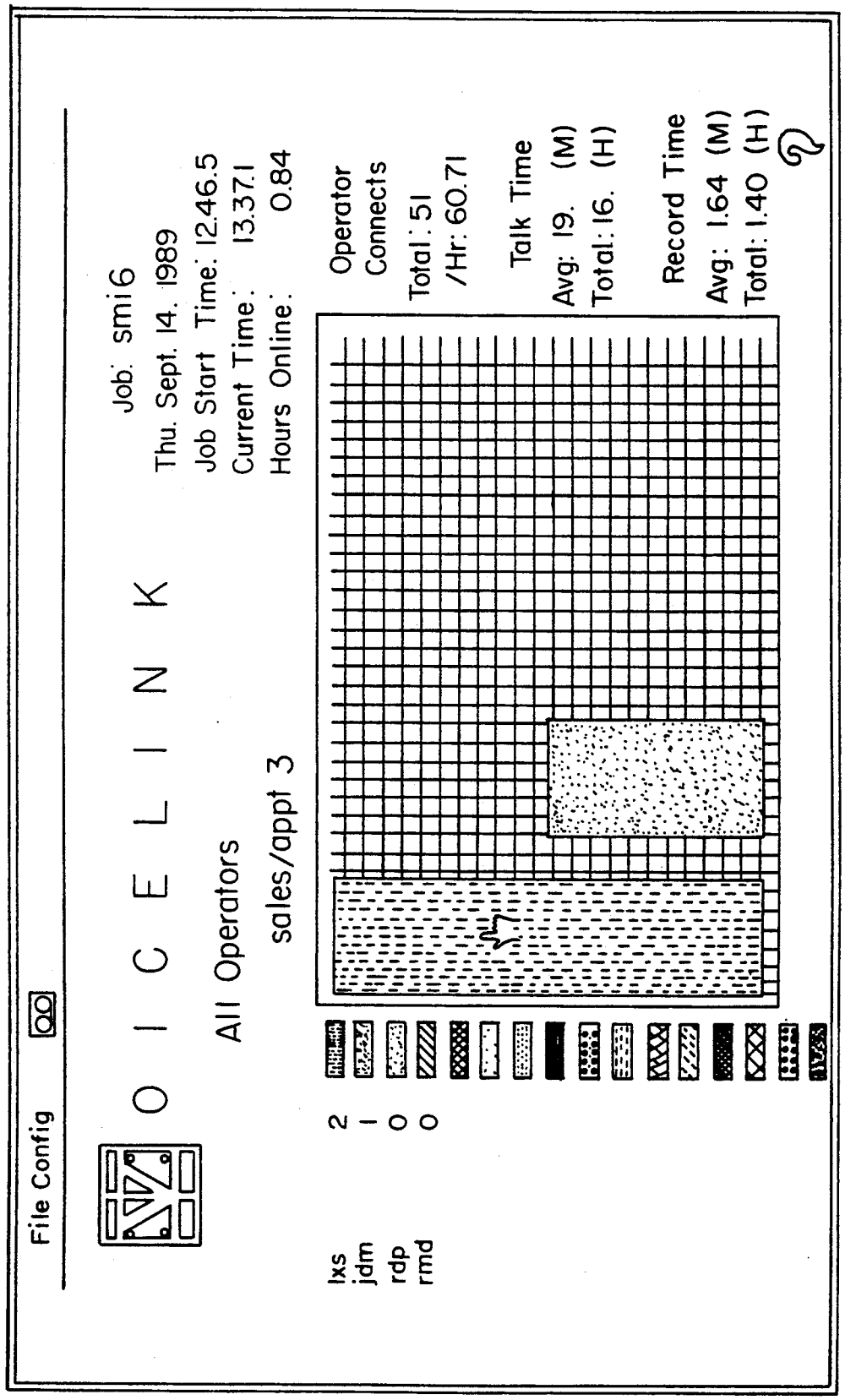
FIG. 10 is an all operator display by the invention.

The following procedure is used to access the All Operator display:

1. The user points to the Voicelink icon.
2. He then holds the Option key of the computer and clicks the mouse button on the monitor icon A small window pops up showing the jobs presently running, such as shown below:
   smi 3
   smi 8
   smi 6
3. The user then points to the job he wants, and clicks the mouse button. The monitoring system displays the All Operator Job display screen, as shown in FIG. 10.

Immediately on entry, the display begins showing the selected information. First, the data fields fill in to show the data extracted from the Voicelink system. Next, the operator bar chart fills in to show the results for a single release code across all operators on the job. The top of the screen shows the selected release code number, its meaning, and the total number of releases of this code for all operators currently on the job. It is important to understand that the number displayed here represents the current status and not cumulative status. The total number of releases is the total for operators currently on the job and does not account for operators who have been on the job but signed out.

The bar chart in the center shows the fact that operators can spend differing amounts of time on the system.

The upper right part of the screen displays the following information:

| Field | Description |
| --- | --- |
| Job: | The name of the selected job. |
| Date: | The day of the week and current date. |
| Job Start Time: | The time the job started. |
| Current Time: | Current system time. |
| Hours Online: | Hours the job has been running. |

To the right side of the bar chart, the following information is displayed:

| Field | Description |
| --- | --- |
| | Operator Connects |
| Total: | Total connects the operators have made on the job. |
| /Hr: | Average connects per hour on the job. |
| | Talktime |
| Avg: | Average talk time per call expressed in minutes. |
| Total: | Total time with all customers expressed in hours. |
| | Record Time |
| Avg: | Average time on record after call expressed in minutes (M). |
| Total: | Total time with all records expressed in hours (H). |

After the screen has generated its statistics, it remains static to allow the user whatever time he needs to evaluate the information on the screen and, if a printer is attached, to print it.

Updates occur to the screen only on command. The user points to the bar chart in the center of the screen and clicks the mouse button. The display updates all information again as it did when it first displayed on the computer monitor.

To leave the display and return to the Overview screen, the user points to the Voicelink "V" symbol in the upper left corner and clicks the mouse button.

Using the Single Job Display

The Single Job display provides the user with a complete view of statistics for a single job in a simplified form. Two charts are used to help evaluate current job results. This information must be understood to be real-time information only. It will appear only while the job is running and will be discarded when the job is complete.

The following procedure is used to access the Single Job display:

1. The user points to the Voicelink icon.
2. He then holds the Shift key of the computer and clicks on the icon. The monitoring system displays a window showing the current jobs running, such as shown below:
   smi3
   smi6
   smi8
3. The user then holds down the mouse button and drags the mouse cursor to cover the name of the job he wants. The job name is highlighted.
4. The user then releases the mouse button. The computer monitor displays the Single Job display screen, as shown in FIG. 11.

When the display appears, the various data fields begin to display information about the job extracted from the Voicelink system. Next, the job's bar chart fills in to show the job's calling results across six selected release codes. Finally, the calling productivity chart updates to show the use of system and operator time on the job.

Each display identifies the job selected by name or system ID. Blocks of different types of statistical information appear on the display.

Figure 11:
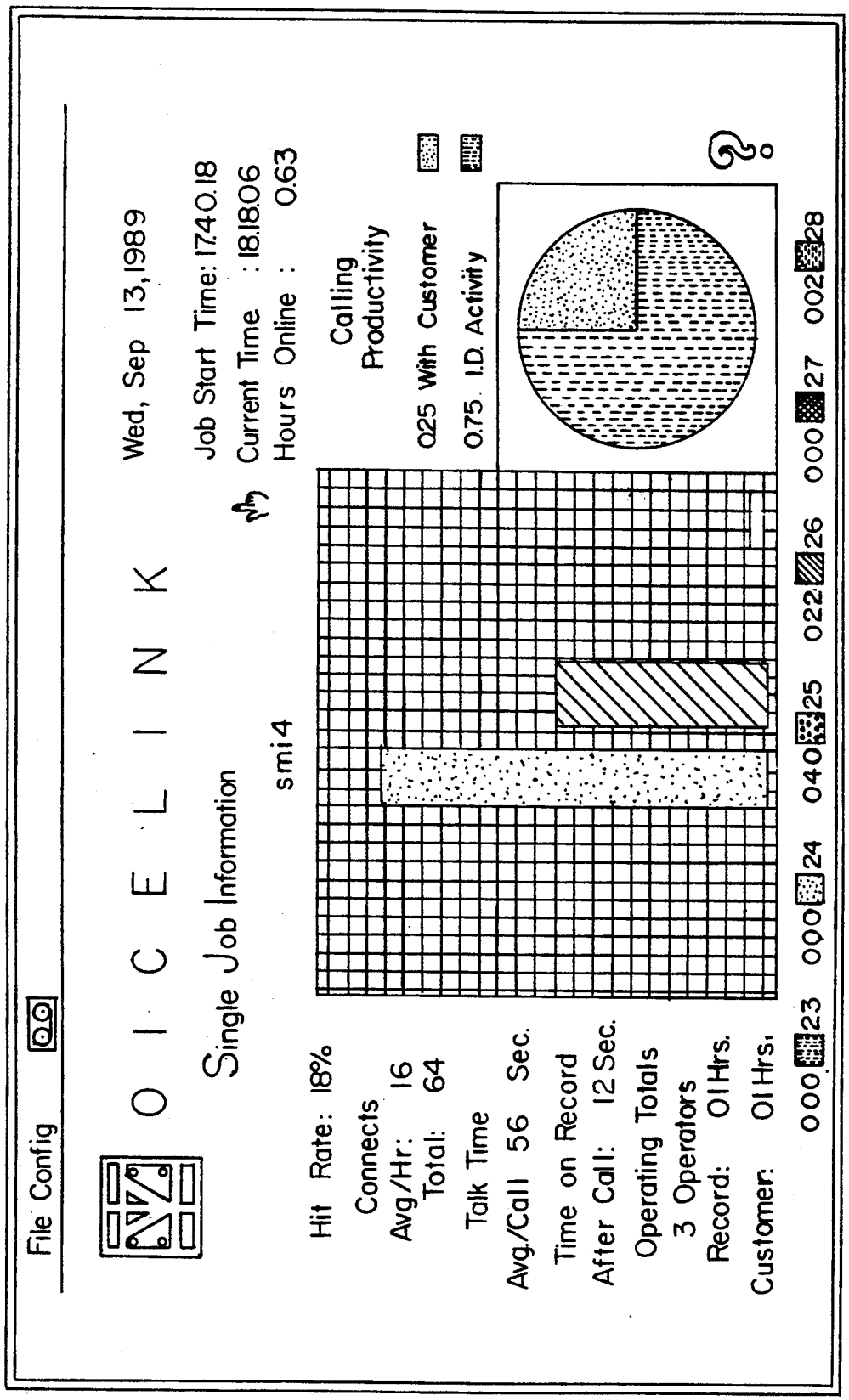
FIG. 11 is a single job display used by the invention.

The release code bar chart in the center of the screen of FIG. 11 shows the number of times operators have released records using the selected code. Each code is documented beneath the chart in three ways:

A three-digit number shows the number of times the release code has been used.

A pattern block identifies the specific bar used to represent the code on the chart.

A two-digit number shows the actual release code number.

The chart is automatically scaled to fit the window.

The user can control the release codes displayed through the Tables"option on the "Config"menu. The user can change the release codes as needed to meet his ongoing requirements for monitoring operator performance on a given job.

The user can see the definition for each release code by pointing to the code number at the bottom of the screen and clicking the mouse button. A small explanation box pops up containing a short explanation for the release code.

The calling productivity chart in FIG. 11 shows the time the Voicelink system spends processing customer calls as compared to the time operators spend with the customer. In effect it measures the work done by the automatic dialing program of the Voicelink system to assure the most efficient use of the operator's time on a job.

The left side of the Single Job display of FIG. 11 provides the user with the following statistics:

| Field | Description |
|---|---|
| Hit Rate: | The percentage of connects per calling attempts. |
| | Connects |
| Avg/Hr: | Average connects per hour on the current job. |
| Total: | Total connects the operator has made on the current job. |
| | Talk Time |
| Average/Call: | Average talk time per call expressed in seconds. |
| | Time on Record |
| After Call: | Average time on record after call expressed in seconds. |
| | Operator Totals |
| Operators: | Number of active operators on job. |
| Record: | Total time with all records expressed in hours. |
| Customer: | Total time with all customers expressed in hours. |

The right side of the Single Job display provides the user with the following information:

| Field | Description |
|---|---|
| Current day and date: | |
| Job Start Time: | The time the job started running. |
| Current Time: | The current system time. |
| Hours Online: | The number of hours the job has run. |

After the screen has generated its statistics, it remains static to allow the user whatever time he needs to evaluate the information on the screen and, if a printer is attached, to print it.

Updates occur to the screen only on command. The user points to the bar chart in the center of the screen and clicks the mouse button. The display updates all information again as it did when it first displayed on the computer monitor.

To leave the display and return to the Overview screen, the user points to the Voicelink "V" symbol in the upper left corner and clicks the mouse button.

Setting System Configuration

The Configuration screen allows the user to select the type of information the monitoring system displays and to control the computer monitor's update function.

The monitoring system configuration can be modified from any screen where the "Config" pull-down menu is displayed with the exception of the Startup display. To access configuration options, the user points to the "Config" and holds the mouse button down. The pull-down "Config" menu displays the following options:

| |
|---|
| Auto |
| Entry |
| Tables |

The auto update and update on entry items on this menu toggle on and off. The user holds down the mouse button and points to either item to toggle it on or off. A check mark in front of "Auto" or "Entry" indicates the configuration is on. The purpose of these two configuration items is as follows:

| | |
|---|---|
| Auto | The automatic update switch tells the application whether to periodically update the Overview screen without operator intervention. When this switch is on, the Overview display updates periodically according to the time set in the full-screen Configuration menu that appears when the user selects "Tables." |
| Entry | When the update on entry switch is on, the Overview screen updates every time the user returns to it. Some users prefer this update method to automatic updating. However, it can be disturbing when the user changes rapidly from operator to operator. If switching between displays frequently, this switch should be left off |

Figure 12:
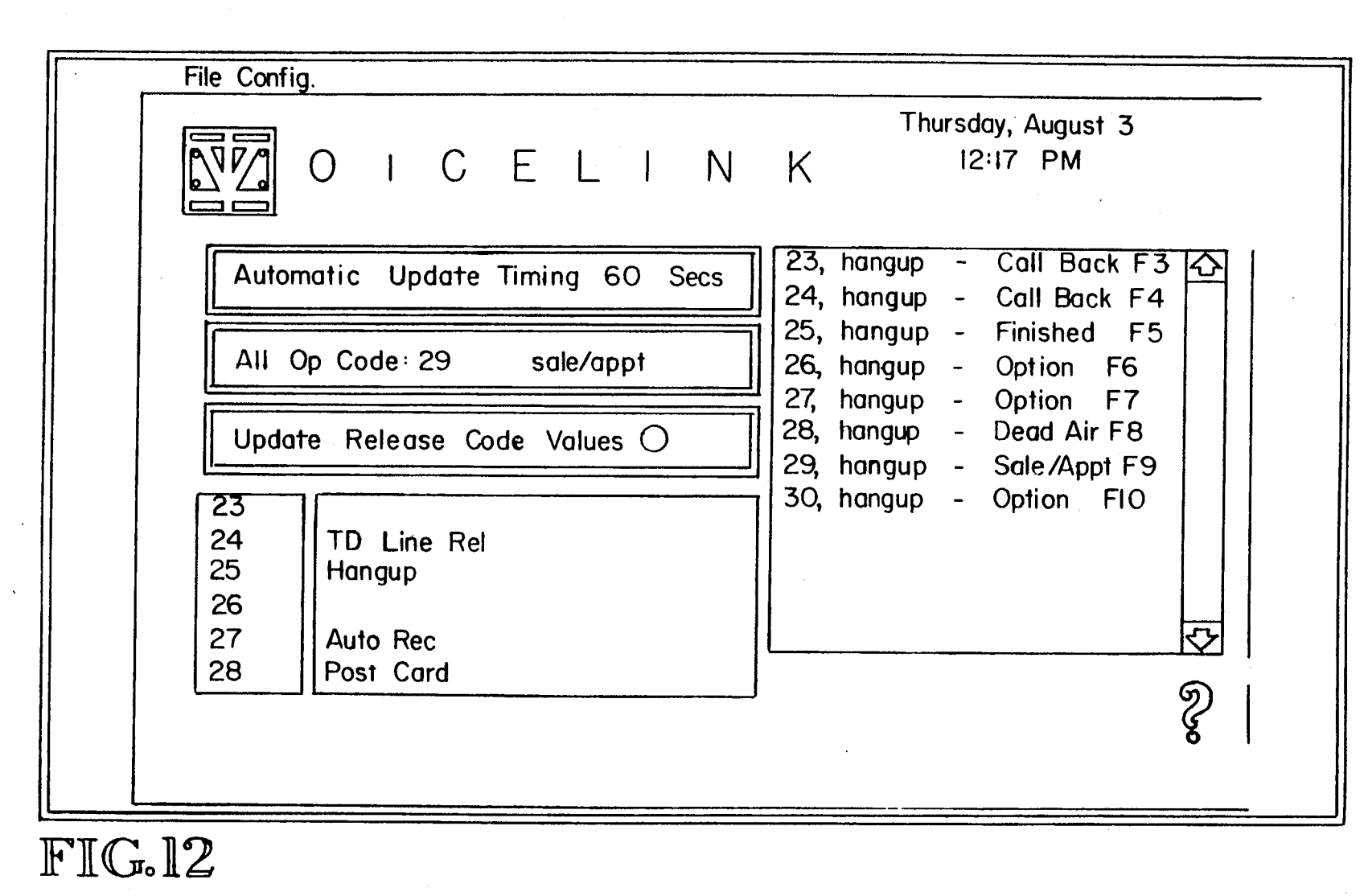

To select "Tables," the user holds down the mouse button and drags the mouse to this item on the pull-down menu. The computer monitor displays the full-screen Configuration screen, as shown in FIG. 12.

When the Configuration screen ("Tables" option) appears, the current date and time are displayed in the upper right corner.

The Configuration screen allows the user to perform the following tasks:
Change the timing for automatic updates.
Change the All Op code number and meaning.
Change the release code numbers and IDs.

The user can work with one or all of these configurations. When all changes have been completed, the user points to the highlighted "V" in Voicelink and clicks the mouse button to return to the Overview screen.

Changing the Automatic Update Timing

Figure 13:
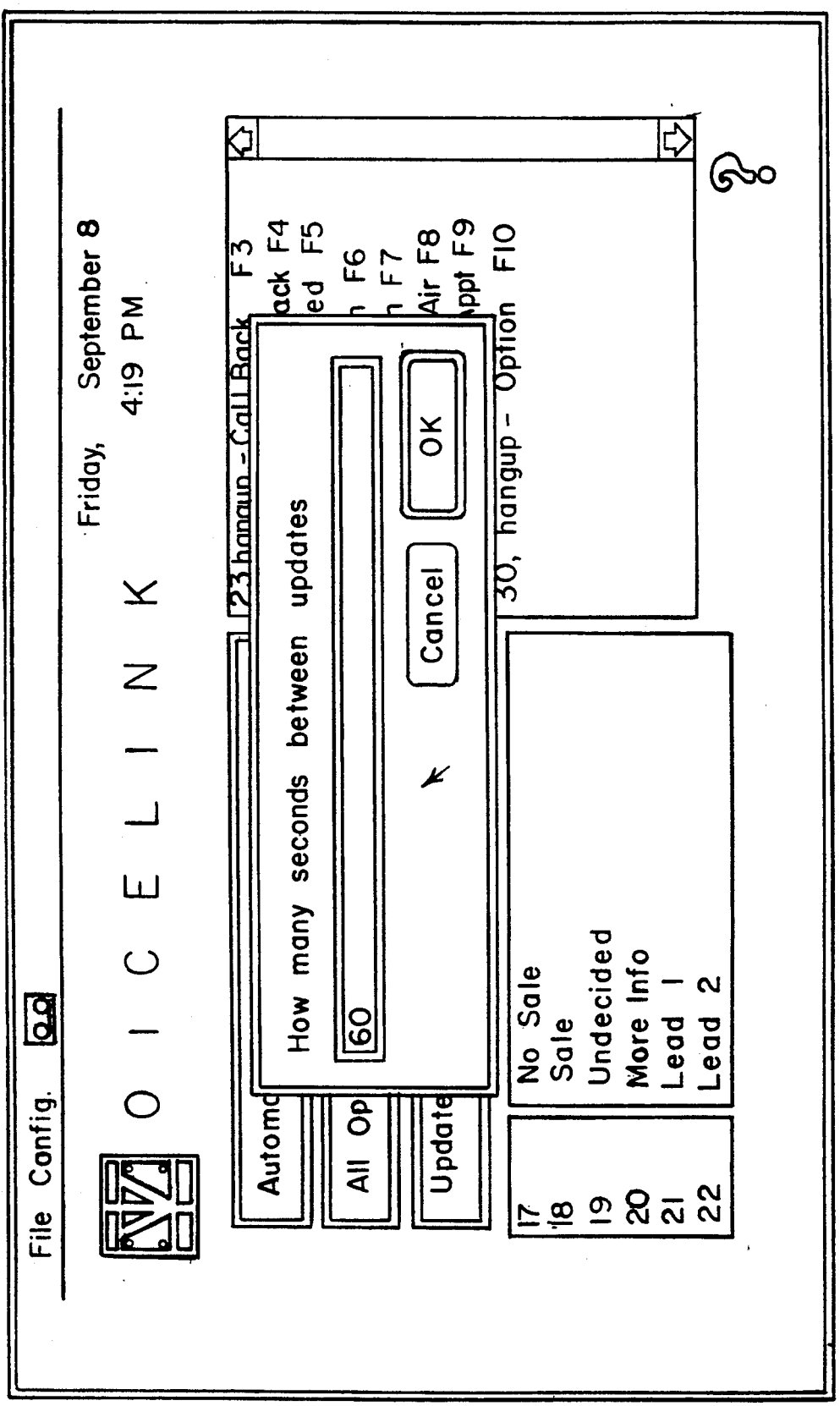
FIG. 13 is an automatic update timing display used by the invention.

To change the automatic update timing, the user points to the Automatic Update box and clicks the mouse button. An Update window displays on the screen, as shown in FIG. 13.

To change the number of seconds between updates, the user types a new number in the highlighted box. He then points to the "Cancel" option and clicks the mouse button to leave the existing number in place. The user then points to the "OK" option and clicks to register the new timing. The computer monitor then returns to the Configuration screen. The new time appears in the Automatic Update box.

Changing the All Op Code

The monitoring system allows the user to highlight a particular release code for monitoring on a particular job or with individual operators. The code designated as the All Op code appears on the All Op display. The bar chart used on that display shows the relative performance of all operators with respect to the release code chosen The Quick Operator Display Window also shows the number of times each operator has used this release code during the current job.

Using the mouse in the window on the right side of the display, the user can scroll back and forth through the release codes being used on the Voicelink system.

Figure 14:
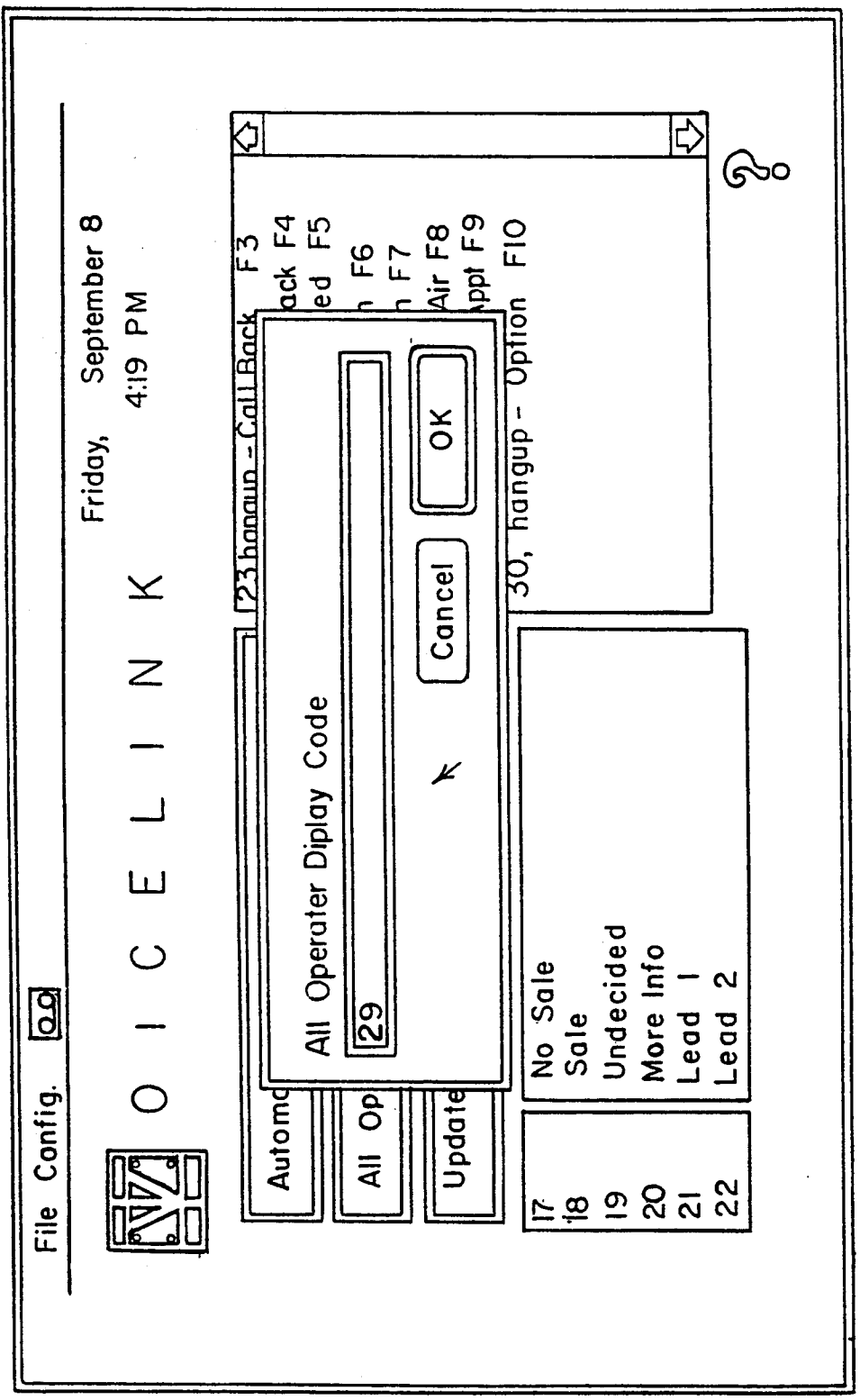
FIG. 14 is an all operator code number selection window used by the invention.

To change the current All Op code, the user points to the code number and clicks the mouse button. The computer monitor displays the All Op Code Number window, as shown in FIG. 14.

Figure 15:
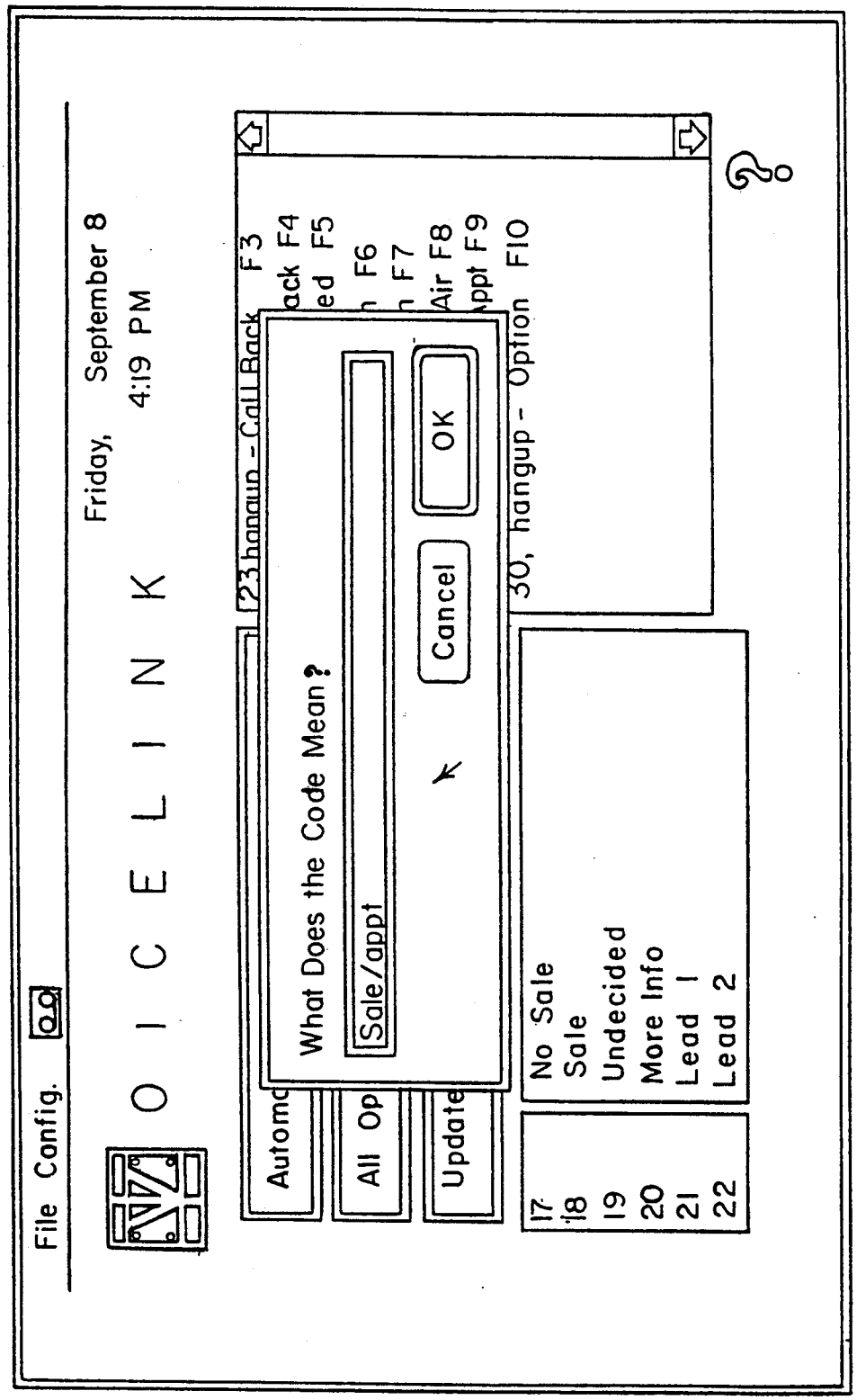
FIG. 15 is an all operator code meaning selection window used by the invention.

To change the release code number, the user types the new number in the highlighted box. He then points to the "Cancel" option and clicks the mouse button to leave the existing number in place. The user then points to the "OK" option and clicks to register the new release code number. When he selects a new release code number, the computer monitor immediately displays the All Op Code description window, as shown in FIG. 15.

To change the release code description or meaning, the user types a new description in the highlighted box. He then points to the "Cancel" option and clicks the mouse button to leave the description in place. The user then points to the "OK" option and clicks the mouse button to process the new description. The computer monitor then returns to the Configuration screen. The new All Op code number and description are displayed.

It is noted that the user can select to change only the description for the selected code by pointing to the current description and clicking the mouse button. Only the description window will then appear.

Changing Release Code Values

Six release code numbers and values or descriptions can be selected and modified on the Configuration screen. These codes appear on the Single Operator display. The codes are used in the display's bar chart to show operator results with respect to each of the selected codes. The two boxes at the bottom left of the Configuration screen show the release code numbers and description that apply to the current job.

To change release code values, the user points to the Release Code Values box and clicks the mouse button. A window appears showing the user the current jobs running, such as shown below:

smi 6
smi 3
smi 8

The user then points to the job he wants and clicks the mouse button. The list of current release codes (found below the box) updates to reflect the codes in use in the job selected.

The user can change the release code numbers and/or the accompanying description or ID.

Figure 16:
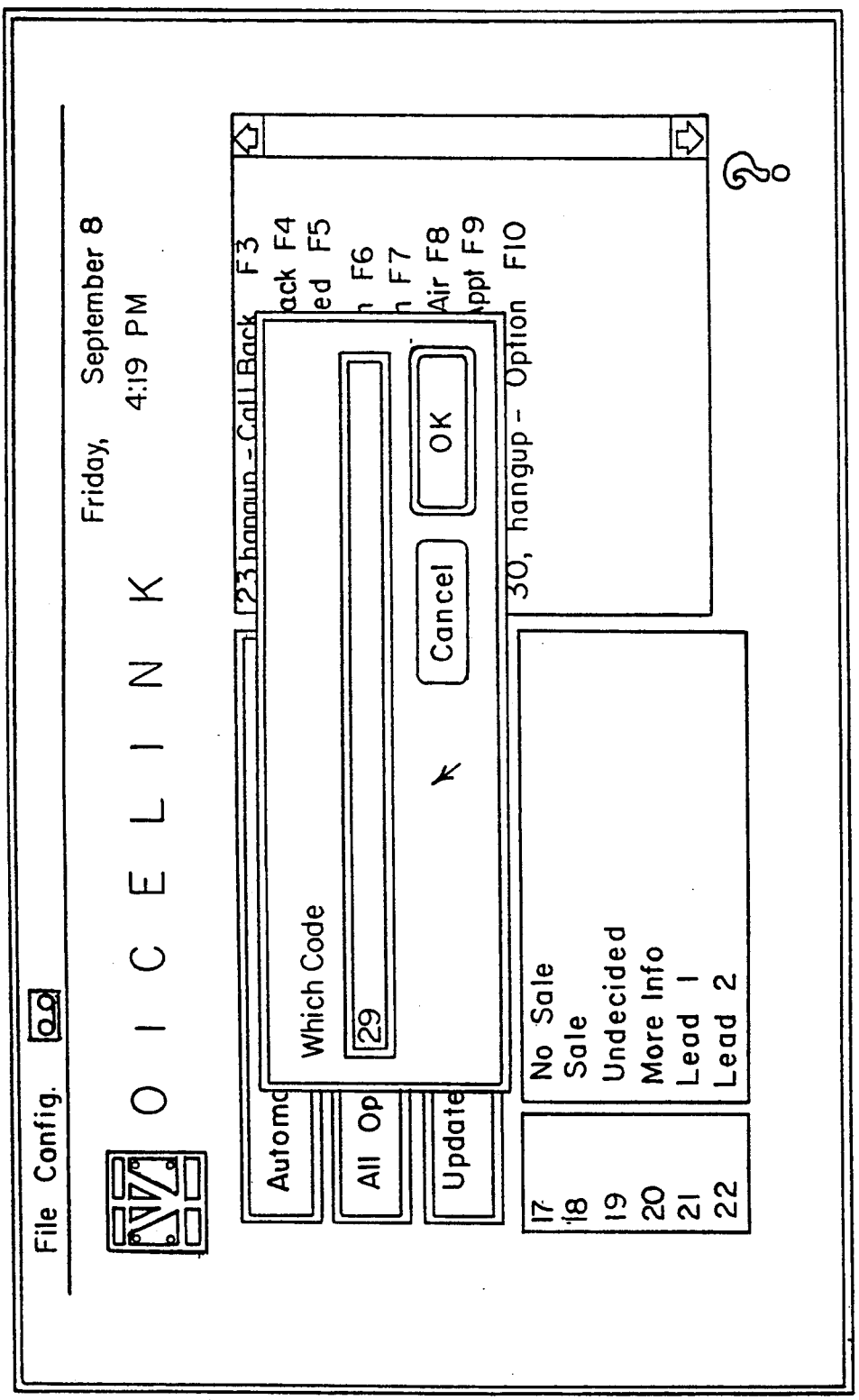
FIG. 16 is a release code numbers window used by the invention.

To change a release code number, the user points to the number and clicks the mouse button. The computer monitor displays a Release Code Numbers window, as shown in FIG. 16.

To change the release code number, the user types a new number in the highlighted box. He then points to the "Cancel" option and clicks the mouse button to leave the existing number in place. The user then points to the "OK" option and clicks to register the new release code number. When a new release code number is selected, the computer monitor removes the window and returns to the full Configuration screen.

Figure 17:
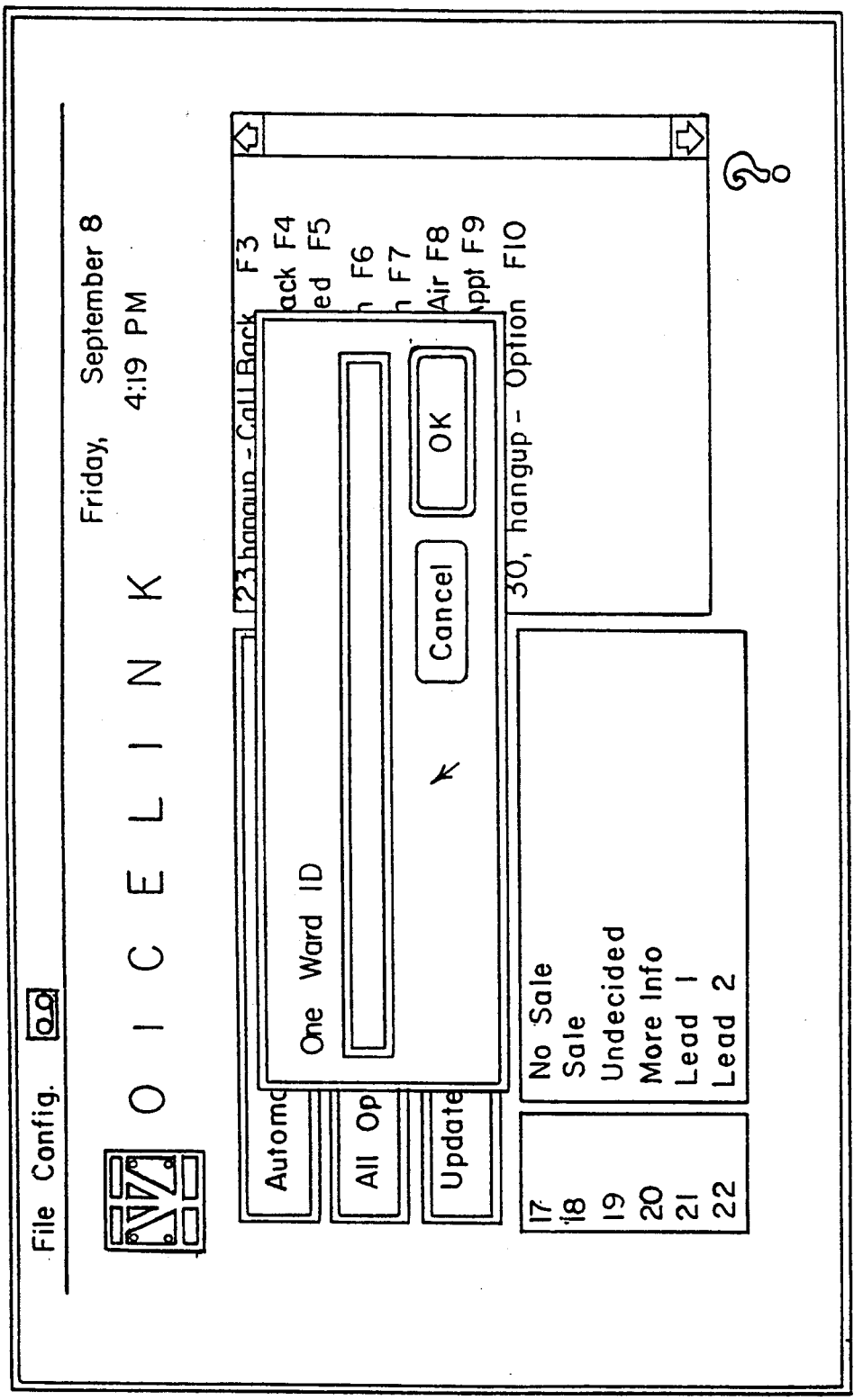
FIG. 17 is a release code ID window used by the invention.

To change a release code ID, the user points to the ID and clicks the mouse button. The computer monitor displays a Release Code ID Window, as shown in FIG. 17.

To change the release code number, the user types a new number in the highlighted box. He then points to the "Cancel" option and clicks the mouse button to leave the existing number in place. The user then points to the "OK" option and clicks the mouse button to register the new release code number. When a new release code number is selected, the computer monitor removes the window and returns to the full Configuration screen.

Printing Screen Displays

The monitoring system can be used to create simplified, visual reports. For example, the user can print operator statistics to review operator performance or print job displays (All Operator Display) to capture current calling results focused on a release code.

Figure 18:
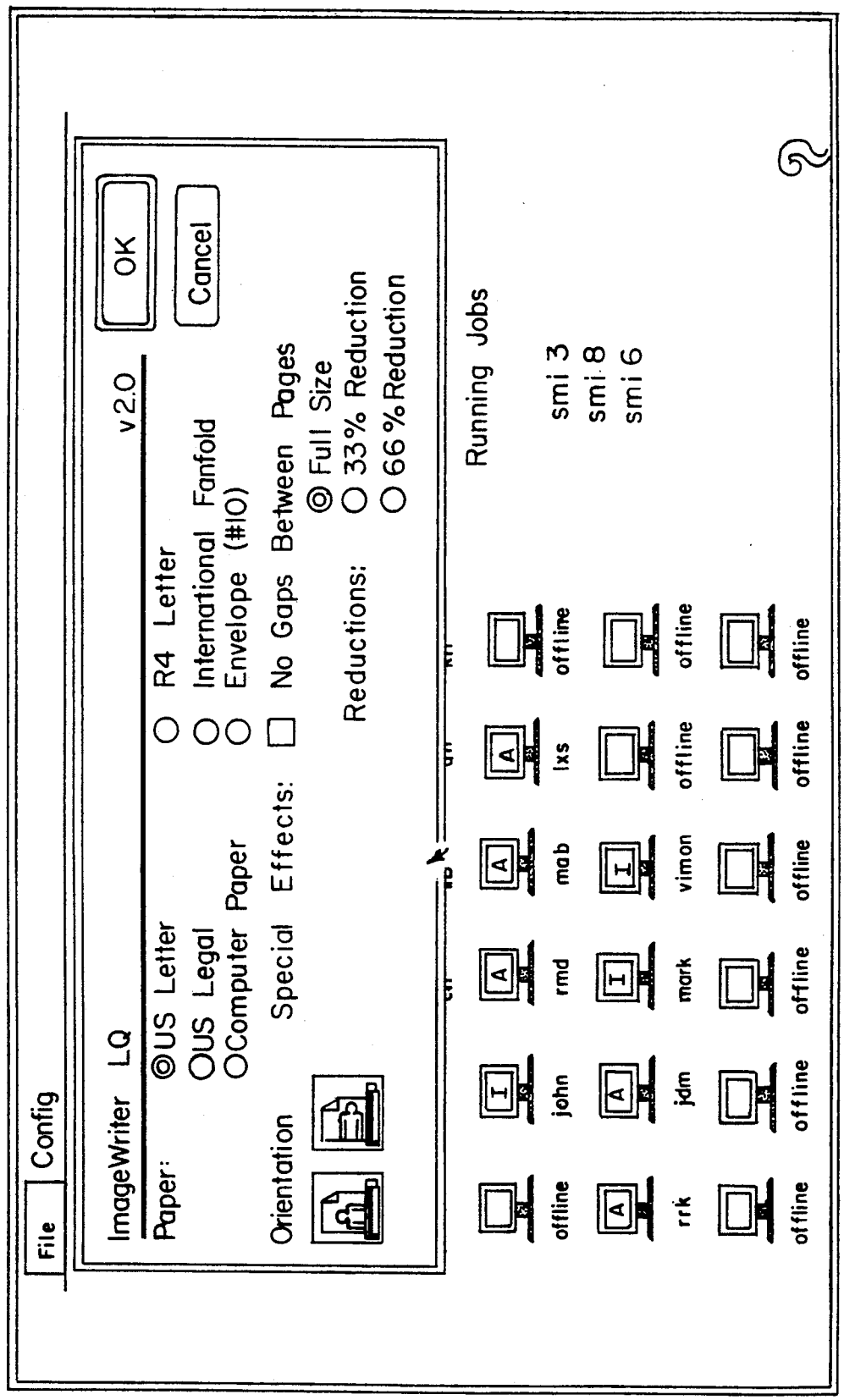
FIG. 18 is a print window used by the invention.

The following procedure is used to print reports:
1. The user opens the display to the screen he desires to print.
2. He then points to the "File" menu at the top, left corner of the screen and holds down the mouse button to display the following File menu:
   about
   Logout
   Print
   Quit
3. The user holds the mouse button down and drags the mouse to the "Print" option. The print option highlights. The "Print" option can also be selected by holding the Apple computer key and pressing "P."
4. The user then releases the mouse button. The monitor will display the "Print" window, as displayed in FIG. 18.

This window is used to choose the print configuration desired, including the following items:
Paper type or format
Orientation (landscape or portrait)
Special effects (gaps between pages)
Image size (full or percent reduction)

When the configurations selection is complete, the user moves the mouse to the "OK" option and clicks the mouse button. Selecting the "Cancel" option returns the user to the full Configuration screen.

Using the Monitoring System With a Dialup System

A Dialup mode is provided for managers who need to monitor one or more Voicelink installations situated in different locations. This mode provides direct access to those systems by phone and gives the manager immediate updates on current calling activities.

Using the monitoring system with a remote Voicelink system requires the following items:
A Hayes or Hayes-compatible modem attached to the Macintosh computer system.
A dialup connected to the Voicelink system and configured to answer the phone.

In dialup mode, all current jobs on the connect Voicelink system display on the Overview screen and can be accessed using the All Operator display.

The following procedure outlines how to use the computer monitor in the dialup mode:
1. Start the monitoring system. After selecting the monitor icon, a Startup screen appears, as shown in FIG. 2.

When the Start up screen appears, the direct mode is normally selected at a Baud rate of 9600.

2. The user then points to the dialup box and clicks the mouse button. The "X" changes to that box and the baud rate changes automatically to 1200. If using a different baud rate, the user points to it and clicks the mouse button.
3. If the Phone box is empty, the user points inside the box and clicks the mouse button. The user then types in the phone number for the dialup. To change an existing number points inside the box. The user holds down the mouse button and drags across the box. When the number is completely highlighted, the user releases the button and types in the new number. It automatically replaces the selected number.
4. The user then points inside the System box and clicks the mouse button. He then types in the name of the system he wishes to call. To change an existing system name, the user points inside the box, and then holds down the mouse button and drags across the box. When the name is completely highlighted, he releases the button and types in the new name. It automatically replaces the existing name.
5. The user next points to the "OK" option and clicks the mouse button. The computer monitor attempts to call the number provided. When a connect is made, the login screen appears (see FIG. 3). If the computer cannot find a modem at that number, it will give a statement that it was unable to connect.

Shifting Between Systems

Multiple Voicelink systems installed at a single location can be run to a single Macintosh computer display through a multiple serial switch. If the user has two systems, a standard A/B switch is used. Larger switches for multiple system connection can be used.

The monitoring system does not control the process of shifting between systems. It does not know about the changing of any switches to move from one system to another system. For this reason, the user must be sure to take the following steps each time he changes systems:
1. The user points to the "File" menu at the top left of the screen and holds down the mouse button to display the pull-down File menu, such as shown below:
about
Logout
Print
Quit
2. He then holds down the mouse button and drags the pointer to Logout. When it highlights, the user releases the button. The computer monitor returns to the Startup screen (see FIG. 2).
3. The user switches to the new system.
4. He then points to the "OK" option and clicks the mouse button to log in to the new system.

Shutting Down the Monitoring System

The monitoring system maintains a realtime connection to the Voicelink system. If this connection is broken without a proper logout, the connection port will be left hanging with the monitoring process continuing.

The following procedure is used to shut down the monitoring system:
1. The user points to the "File" menu at the top left of the screen and holds down the mouse button to display the pull-down File menu.
2. He continues holding the mouse button down and pulls the mouse until the "Quit" option on the menu is highlighted.
3. He then releases the mouse button. The monitor signs out of the Voicelink system and returns to the desktop display.
4. At the desktop display, the user moves the mouse to the "Special" option on the menu bar and holds the button down. The Special menu will drop down from the menu bar.
5. He then pulls the mouse down until the "Shutdown" option is highlighted.
6. The user then releases the mouse button. The Macintosh computer shuts itself down and tells the user when it is safe to turn power off.
7. Lastly, the user turns the power switch to "off" to turn off power to the display system.

It will be appreciated that, although a specific embodiment of the invention has been described herein for purposes of illustration, various modifications may be made without departing from the spirit and scope of the invention. Accordingly, the invention is not to be limited except as by the appended claims.

We claim:

1. A monitoring system for a user to monitor a computer-based telephone management system having a call accounting file maintained on a realtime basis with raw call accounting data for jobs running on the telephone management system compiled for substantially all calls made during the elapsed time between start of a job to the time the user monitors the telephone management system, comprising:

data acquisition means for reading and interpreting the raw call accounting data from the call accounting file, said data acquisition means including means for periodically reading the raw call accounting data from the call accounting file to have near realtime call accounting data for processing, and means for converting the raw call accounting data read from the call accounting file to statistics about call operation of the telephone management system which are meaningful to the user for the duration of the jobs being run from job start to the time the user monitors the telephone management system;

display management means for querying the data acquisition means as needed to respond to user requests for selected call accounting data containing near realtime call accounting data;

control means operable by the user for selectively requesting the display management means to present selected call accounting data which contains near realtime call accounting data;

means for transferring user requests for selected call accounting data from the display management means to the data acquisition means, and for transferring the selected call accounting data from the data acquisition means to the display management means; and presentation means for presenting to the user the selected call accounting data provided by the data acquisition means to the display management means.

2. The monitoring system of claim 1 wherein the presentation means includes a visual display device, and the display management means formats the selected call accounting data for graphical presentation on the visual display device.

3. The monitoring system of claim 2 wherein the display management means selects from a plurality of graphical displays for the selected call accounting data, with the particular graphical display being selected by the display management means based upon the particular call accounting data selected by the user.

4. The monitoring system of claim 2 wherein the control means includes means for the user to alternately select call accounting data on a single telephone operator using the telephone management system and call accounting data on all telephone operators using the telephone management system for a selected job being run on the telephone management system.

5. The monitoring system of claim 2 wherein the control means includes means for the user to select call accounting data on a selected job being run on the telephone management system from a plurality of jobs being simultaneously run on the telephone management system.

6. The monitoring system of claim 2 wherein the control means includes means to alter the formats used by the display management means for the selected call accounting data, whereby the user can tailor the formatting of the selected call accounting data presented on the visual display device to suit the user's management needs.

7. The monitoring system of claim 6 wherein the control means includes means to alter the graphical displays used for the selected call accounting data on the visual display device.

8. The monitoring system of claim 1 wherein upon initial startup of the monitoring system, the data acquisition means automatically reads the raw accounting data available from the call accounting file to establish initial call accounting data for processing prior to receipt of a first query for selected call accounting data from the display management means.

9. The monitoring system of claim wherein the data acquisition means periodically reads the raw call accounting data from the call accounting file without interfering with the operation of the telephone management system, whereby a user of the telephone management system will be unaware that the monitoring system is in operation.

10. The monitoring system of claim 1 wherein the data acquisition means includes a computer program residing on the computer of the telephone management system, and the display management means includes a computer program residing on a different computer at a remote location.

11. The monitoring system of claim 1 for use with call accounting data including data indicating which operators of the telephone management system are logged onto the telephone management system and whether those operators are active or inactive, wherein the data acquisition means reads said operator data and the data management means provides said operator data to the presentation means automatically upon initial startup, and subsequently thereafter, upon the user selecting such operator data for presentation using the control means.

12. A method for monitoring a computer-based telephone management system having a call accounting file maintained on a realtime basis with raw call accounting data for jobs running on the telephone management system compiled for substantially all calls made during the elapsed time between start of a job to the time the user monitors the telephone management system, comprising:

selectively reading the raw call accounting data from the call accounting file so as to have near realtime call accounting data for processing;

converting the raw call accounting data read from the call accounting file to statistics about call operation of the telephone management system which are meaningful to the user for the duration of the jobs being run from job start to the time the user monitors the telephone management system;

storing said read raw accounting data and said statistics about call operation;

providing means to query said stored raw call accounting data and statistics as needed in response to the user's request for selected call accounting data containing near realtime call accounting data;

selectively requesting selected call accounting data from said stored raw call accounting data and statistics so that said selected near realtime call accounting data is available in response to user requests for said selected call accounting data; and presenting said selected call accounting data to the user.

13. A monitoring system for a user to monitor a computer-based telephone management system having a call accounting file maintained on a realtime basis with raw call accounting data for jobs running on the telephone management system compiled for substantially all calls made during the elapsed time between start of a job to the time the user monitors the telephone management system, comprising:

data acquisition means for reading the raw call accounting data from the call accounting file so as to have near realtime call accounting data for processing, and for converting the raw call accounting data read from the call accounting file to statistical call accounting data about call operation of the telephone management system which are meaningful to the user for the duration of jobs being run from job start to the time the user monitors the telephone management system;

display management means for querying the data acquisition means as needed to respond to user requests for selected statistical call accounting data containing near realtime call accounting data;

control means operable by the user for selectively requesting the display management means to present the selected statistical call accounting data which contains near realtime call accounting data;

means for transferring user requests for selected statistical call accounting data from the display management means to the data acquisition means, and for transferring the selected statistical call accounting data from the data acquisition means to the display management means; and presentation means for presenting to the user the selected statistical call accounting data provided by the data acquisition means to the display management means.

* * * * *

UNITED STATES PATENT AND TRADEMARK OFFICE
CERTIFICATE OF CORRECTION

PATENT NO. :     5,101,425

DATED      :     March 31, 1992

INVENTOR(S) :    Stanley E. Darland et al.

It is certified that error appears in the above-identified patent and that said Letters Patent is hereby corrected as shown below:

In column 21, claim 9, line 38, after "claim" please insert -- 1 --.

Signed and Sealed this

Twenty-ninth Day of June, 1993

Attest:

MICHAEL K. KIRK

Attesting Officer      Acting Commissioner of Patents and Trademarks